US011050558B2

(12) United States Patent
Georgieva et al.

(10) Patent No.: US 11,050,558 B2
(45) Date of Patent: Jun. 29, 2021

(54) ARITHMETIC FOR SECURE MULTI-PARTY COMPUTATION WITH MODULAR INTEGERS

(71) Applicant: Inpher, Inc., New York, NY (US)

(72) Inventors: Mariya Georgieva, Nanterre (FR); Nicolas Gama, Lausanne (CH); Dimitar Jetchev, St-Saphorin-Lavaux (CH)

( * ) Notice: Subject to any disclaimer, the term of this patent is extended or adjusted under 35 U.S.C. 154(b) by 0 days.

(21) Appl. No.: 17/093,008

(22) Filed: Nov. 9, 2020

(65) Prior Publication Data

US 2021/0058241 A1 Feb. 25, 2021

Related U.S. Application Data

(63) Continuation of application No. PCT/US2020/019551, filed on Feb. 24, 2020.
(Continued)

(51) Int. Cl.
*H04L 9/08* (2006.01)
*G06F 17/11* (2006.01)

(52) U.S. Cl.
CPC .............. *H04L 9/085* (2013.01); *G06F 17/11* (2013.01); *H04L 2209/46* (2013.01)

(58) Field of Classification Search
CPC ..... H04L 9/085; H04L 9/3218; H04L 9/0861; H04L 2209/04; H04L 9/0869;
(Continued)

(56) References Cited

U.S. PATENT DOCUMENTS 7,181,017 B1 * 2/2007 Nagel ................... H04L 9/0825
380/282
7,945,784 B1 * 5/2011 Masinter ................. H04L 9/085
713/180
(Continued)

FOREIGN PATENT DOCUMENTS

| CA | 3072638 A1 | 3/2019 |
|---|---|---|
| KR | 20200044103 A | 4/2020 |
| WO | 2019046651 A2 | 3/2019 |

OTHER PUBLICATIONS

Payman Mohassel and Yupeng Zhang, SecureML: A System for Scalable Privacy-Preserving Machine Learning, 2017, IEEE Symposium on Security and Privacy.*
(Continued)

*Primary Examiner* — David Garcia Cervetti
(74) *Attorney, Agent, or Firm* — Patent GC LLC; Alexander Franco

(57) ABSTRACT

A secure multi-party computation implements real number arithmetic using modular integer representation on the backend. As part of the implementation, a secret shared value jointly stored by multiple parties in a first modular representation is cast into a second modular representation having a larger most significant bit. The parties use a secret shared masking value in the first representation, the range of which is divided into two halves, to mask and reveal a sum of the secret shared value and the secret shared masking value. The parties use a secret shared bit that identifies the half of the range that contains the masking value, along with the sum to collaboratively construct a set of secret shares representing the secret shared value in the second modular format. In contrast with previous work, the disclosed solution eliminates a non-zero probability of error without sacrificing efficiency or security.

20 Claims, 14 Drawing Sheets

---

Lift Operation: Offline Phase

Input: The mask $\lambda \in 2^{p_{\mathrm{lsb}}}\mathbb{Z}/2^{M_{\mathrm{msb}}}\mathbb{Z}$ of a modular real number

Output: Precomputed shares $[\![b]\!]_{M'_{\mathrm{msb}}-M_{\mathrm{msb}},0}$ and $[\![\nu]\!]_{M'_{\mathrm{msb}},p'_{\mathrm{lsb}}}$.

1: Set $b = 0$ if $\lambda \in \left[-\dfrac{2^{M_{\mathrm{msb}}}}{4}, \dfrac{2^{M_{\mathrm{msb}}}}{4}\right)$, $b = 1$ if $\lambda \in \left[\dfrac{2^{M_{\mathrm{msb}}}}{4}, \dfrac{3 \cdot 2^{M_{\mathrm{msb}}}}{4}\right)$.

2: $[\![b]\!]_{M'_{\mathrm{msb}}-M_{\mathrm{msb}},0} = \texttt{secretShares}(b, \mathcal{M}_{M'_{\mathrm{msb}}-M_{\mathrm{msb}},0})$ 3: Compute $\nu = \texttt{roundTo}\bigl(\texttt{quartermod}_{2^{M_{\mathrm{msb}}}}(\lambda), 2^{p'_{\mathrm{lsb}}}\bigr) \bmod 2^{M'_{\mathrm{msb}}}$.

4: $[\![\nu]\!]_{M'_{\mathrm{msb}},p'_{\mathrm{lsb}}} = \texttt{secretShares}(\nu, \mathcal{M}_{M'_{\mathrm{msb}},p'_{\mathrm{lsb}}})$ 5: return $[\![b]\!]_{M'_{\mathrm{msb}}-M_{\mathrm{msb}},0}$ and $[\![\nu]\!]_{M'_{\mathrm{msb}},p'_{\mathrm{lsb}}}$.

Related U.S. Application Data

(60) Provisional application No. 62/809,543, filed on Feb. 22, 2019.

(58) Field of Classification Search
CPC ..... H04L 2209/08; H04L 9/083; H04L 9/003; H04L 9/302; H04L 9/0891; H04L 9/0618; H04L 9/0819; H04L 9/002; H04L 2209/56; H04L 2209/24; H04L 2209/46; H04L 9/0838; H04L 9/0625; H04L 9/008; H04L 9/0894; H04L 9/3066; H04L 9/0662; G06F 17/11; G06F 7/723; G06F 7/72; G06F 7/483
See application file for complete search history.

(56) References Cited

U.S. PATENT DOCUMENTS

| | | | | |
|---|---|---|---|---|
| 8,839,410 | B2* | 9/2014 | Kerschbaum | G06F 8/42 726/16 |
| 9,077,539 | B2 | 7/2015 | Kamara et al. | |
| 9,450,938 | B1* | 9/2016 | Lampkins | H04L 67/10 |
| 9,813,234 | B2 | 11/2017 | Clark et al. | |
| 9,929,860 | B1* | 3/2018 | Triandopoulos | H04L 9/085 |
| 10,083,310 | B1* | 9/2018 | Lampkins | G06F 21/606 |
| 10,360,390 | B2* | 7/2019 | Tueno | G06F 21/602 |
| 10,396,984 | B2 | 8/2019 | French et al. | |
| 10,547,592 | B2* | 1/2020 | Bellala | H04L 63/0421 |
| 10,565,524 | B2* | 2/2020 | Bellala | G06N 20/00 |
| 10,664,604 | B2 | 5/2020 | Lindell et al. | |
| 10,885,205 | B2* | 1/2021 | Furukawa | G06F 7/523 |
| 2009/0154711 | A1* | 6/2009 | Jho | H04L 9/083 380/286 |
| 2009/0327141 | A1* | 12/2009 | Rabin | G06Q 20/401 705/75 |
| 2011/0295918 | A1 | 12/2011 | Prouff et al. | |
| 2013/0216044 | A1* | 8/2013 | Gentry | H04L 9/008 380/277 |
| 2013/0275752 | A1 | 10/2013 | Zhang et al. | |
| 2014/0075183 | A1 | 3/2014 | Wang et al. | |
| 2015/0074159 | A1 | 3/2015 | Poschmann et al. | |
| 2016/0004874 | A1* | 1/2016 | Ioannidis | G06F 17/16 713/165 |
| 2016/0149866 | A1* | 5/2016 | Dolev | H04L 51/32 726/30 |
| 2017/0149796 | A1* | 5/2017 | Gvili | H04L 9/0625 |
| 2017/0250816 | A1 | 8/2017 | Popa et al. | |
| 2018/0011996 | A1 | 1/2018 | Dolev et al. | |
| 2018/0349867 | A1* | 12/2018 | Trieflinger | G06Q 20/3829 |
| 2018/0366036 | A1* | 12/2018 | Furukawa | H04L 9/0869 |
| 2018/0373834 | A1* | 12/2018 | Cho | G16B 20/00 |
| 2019/0036678 | A1* | 1/2019 | Ahmed | H04L 9/302 |
| 2019/0116180 | A1 | 4/2019 | Teranishi et al. | |
| 2019/0190705 | A1 | 6/2019 | Dolev | |
| 2019/0212986 | A1 | 7/2019 | Araki et al. | |
| 2019/0311813 | A1* | 10/2019 | Hie | G16H 70/40 |
| 2019/0333415 | A1* | 10/2019 | Hamada | H04L 9/0631 |
| 2019/0372759 | A1* | 12/2019 | Rix | H04L 9/0844 |
| 2019/0372760 | A1* | 12/2019 | Zheng | H04L 9/0894 |
| 2019/0386814 | A1* | 12/2019 | Ahmed | H04L 9/3013 |
| 2020/0019865 | A1* | 1/2020 | Wang | H04L 67/10 |
| 2020/0019867 | A1* | 1/2020 | Nandakumar | G06N 5/04 |
| 2020/0057755 | A1* | 2/2020 | Veeningen | G06F 21/556 |
| 2020/0151356 | A1* | 5/2020 | Rohloff | G06F 21/6227 |
| 2020/0213099 | A1* | 7/2020 | Wright | H04L 9/088 |
| 2020/0220851 | A1* | 7/2020 | Storm | G06Q 20/401 |
| 2020/0228325 | A1* | 7/2020 | Fan | G06F 17/16 |
| 2020/0242466 | A1* | 7/2020 | Mohassel | G06F 21/6254 |
| 2020/0304293 | A1 | 9/2020 | Gama et al. | |
| 2020/0358601 | A1 | 11/2020 | Gama et al. | |
| 2020/0396063 | A1* | 12/2020 | Veeningen | H04L 9/0869 |
| 2021/0005112 | A1* | 1/2021 | Furukawa | H04L 9/0869 |

OTHER PUBLICATIONS

Payman Mohassel and Peter Rindal, ABY3: A Mixed Protocol Framework for Machine Learning, Oct. 2018, ACM.*

Zahur, et al., "Obliv-c: A Language for Extensible Data-Oblivious Computation", IACR Cryptology ePrint Archive, vol. 1153, 2015, 20 pages.

Zahur, et al., "Two Halves Make a Whole—Reducing Data Transfer in Garbled Circuits using Half Gates", 34th Annual International Conference on the Theory and Applications of Cryptographic Techniques, Advances in Cryptology—Eurocrypt 2015, Proceedings, Part II, vol. 9057 of Lecture Notes in Computer Science, Springer, Apr. 26-30, 2015, 28 pages.

European Patent Office, "International Search Report and Written Opinion", Received for PCT Application No. PCT/US2020/019551 dated May 29, 2020, 13 pages.

Krips, et al., "Hybrid Model of Fixed and Floating Point Numbers in Secure Multiparty Computations", 12th European Conference on Computer Vision, Jan. 1, 2014, Dec. 23, 2014, pp. 179-197.

Mohassel, et al., "ABY3: A Mixed Protocol Framework for Machine Learning", Proceedings of the 2018 ACM SIGSAC Conference on Computer and Communications Security, Oct. 15-19, 2018, pp. 35-52.

Mohassel, et al., "SecureML: A System for Scalable Privacy-Preserving Machine Learning", IEEE Symposium on Security and Privacy, May 1, 2017, pp. 19-38.

Abadi, et al., "Deep Learning with Differential Privacy", Proceedings of the 2016 ACM SIGSAC Conference on Computer and Communications Security, Oct. 24-28, 2016, 14 pages.

Aly, et al., "Benchmarking Privacy Preserving Scientific Operations", Applied Cryptography and Network Security—17th International Conference, Proceedings, vol. 11464 of Lecture Notes in Computer Science, Springer, Jun. 5-7, 2019, pp. 509-529.

Aono, et al., "Privacy-Preserving Logistic Regression with Distributed Data Sources via Homomorphic Encryption", IEICE Transactions, Information and Systems, vol. 99-D, No. 8, Aug. 2016, pp. 2079-2089.

Aono, et al., "Scalable and Secure Logistic Regression via Homomorphic Encryption", Proceedings of the Sixth ACM Conference on Data and Application Security and Privacy, Mar. 9-11, 2016, pp. 1-23.

Araki, et al., "High-Throughput Semi-Honest Secure Three-Party Computation with an Honest Majority", Proceedings of the ACM SIGSAC Conference on Computer and Communications Security, Oct. 24-28, 2016,, 13 pages.

Asharov, et al., "More Efficient Oblivious Transfer and Extensions for Faster Secure Computation", Proceedings of the 2013 ACM SIGSAC conference on Computer & communications security, Nov. 4-8, 2013, pp. 535-547.

Bachrach, et al., "CryptoNets: Applying Neural Networks to Encrypted Data with High Throughput and Accuracy", Proceedings of the 33nd International Conference on Machine Learning, Jun. 19-24, 2016, 10 pages.

Bayatbabolghani, et al., "Secure Fingerprint Alignment and Matching Protocols", Feb. 10, 2017, pp. 1-37.

Beaver, "Efficient Multiparty Protocols Using Circuit Randomization", Annual International Cryptology Conference, Crypto 1991: Advances in Cryptology, LNCS, vol. 576, Springer, 1992, pp. 420-432.

Bellare, et al., "Efficient Garbling from a Fixed-Key Blockcipher", IEEE Symposium on Security and Privacy, May 19-22, 2013, pp. 478-492.

Bjorck, "Numerical Methods for Least Squares Problems", Society for Industrial and Applied Mathematics, 1996, 14 pages.

Bogdanov, et al., "Sharemind: A Framework for Fast Privacy-Preserving Computations", ESORICS, LNCS, Springer, vol. 5283, 2008, pp. 192-206.

Boura, et al., "High-Precision Privacy-Preserving Real-Valued Function Evaluation", IACR Cryptology ePrint Archive, 2017:1234, 2017, 26 pages.

Boyd, "A Comparison of Numerical Algorithms for Fourier Extension of the First, Second, and Third Kinds", Journal of Computational Physics, vol. 178, No. 1, May 2002, pp. 118-160.

(56) References Cited

OTHER PUBLICATIONS

Boyd, "Asymptotic Fourier Coefficients for a $C\infty$ Bell (Smoothed—"Top-Hat") & the Fourier Extension Problem", Journal of Scientific Computing, vol. 29, No. 1, Oct. 2006, pp. 1-24.
Boyd, "Fourier embedded domain methods: extending a function defined on an irregular region to a rectangle so that the extension is spatially periodic and $c\infty$", ScienceDirect, Applied Mathematics and Computation, vol. 161, No. 2, Feb. 2005, pp. 591-597.
Catrina, et al., "Secure Computation with Fixed-Point Numbers", Financial Cryptography and Data Security—14th International Conference, vol. 6052 of Lecture Notes in Computer Science, Springer, Jan. 25-28, 2010, pp. 35-50.
Chaudhuri, et al., "Privacy-preserving logistic regression", Proceedings of the Twenty-Second Annual Conference on Neural Information Processing Systems, Advances in Neural Information Processing Systems, vol. 21, Dec. 8-11, 2008, pp. 1-8.
Cho, et al., "Secure genome-wide association analysis using multiparty computation", Nature Biotechnology, Letters, May 7, 2018, 7 pages.
Cramer, et al., "Secure Multiparty Computation and Secret Sharing", Cambridge University Press, 2015, 413 pages.
Damgard, et al., "Multiparty Computation from Somewhat Homomorphic Encryption", Advances in Cryptology—Crypto 2012, 32nd Annual Cryptology Conference, Proceedings, vol. 7417 of Lecture Notes in Computer Science, Aug. 19-23, 2012, pp. 1-46.
Damgard, et al., "SPDZ Software", URL: https://www.cs.bris.ac.uk/Research/CryptographySecurity/SPDZ/, retrieved on Aug. 29, 2017, Aug. 29, 2017, pp. 1-9.
Demmler, et al., "ABY—A Framework for Efficient Mixed-Protocol Secure Two-Party Computation", 22nd Annual Network and Distributed System Security Symposium, Feb. 8-11, 2015, pp. 1-15.
EPO, "International Preliminary Report of Patentability", Application No. PCT/US2018/048963, dated Nov. 18, 2019, 18 pages.
EPO, "International Search Report and Written Opinion", PCT Application No. PCT/US2018/048963, dated Feb. 15, 2019, 15 pages.
Fefferman, "Interpolation and extrapolation of smooth functions by linear operators", Rev. Mat. Iberoamericana, vol. 21, No. 1, 2005, pp. 313-348.
Gascon, et al., "Privacy-Preserving Distributed Linear Regression on High-Dimensional Data", Proceedings on Privacy Enhancing Technologies, vol. 4, 2017, pp. 248-267.
Ghodosi, et al., "Multi-party computation with conversion of secret sharing", Des. Codes Cryptogr, vol. 62, Springer, 2012, pp. 259-272.
Goodfellow, et al., "Deep Learning", URL: http://www.deeplearningbook.org, MIT Press, 2016, 10 pages.
Hemenway, et al., "High-precision Secure Computation of Satellite Collision Probabilities", International Conference on Security and Cryptography for Networks, Security and Cryptography for Networks, LNCS, vol. 9841, Springer, 2016, pp. 1-25.
Hestenes, "Extension of the Range of a Differentiable Function", Duke Math. J., vol. 8, 1941, pp. 183-192.
Huybrechs, "On the Fourier Extension of Nonperiodic Functions", SIAM J. Numerical Analysis, vol. 47, No. 6, 2010, pp. 4326-4355.
Jaschke, et al., "Accelerating Homomorphic Computations on Rational Numbers", Applied Cryptography and Network Security: 14th International Conference, Proceedings, vol. 9696 of LNCS, Springer, Jun. 19-22, 2016, pp. 405-423.
Keller, et al., "MASCOT: Faster Malicious Arithmetic Secure Computation with Oblivious Transfer", Proceedings of the 2016 ACM SIGSAC Conference on Computer and Communications Security, vol. 505, Oct. 2016, pp. 1-39.
Kolesnikov, et al., "A systematic approach to practically efficient general two-party secure function evaluation protocols and their modular design", Journal of Computer Security, vol. 21, No. 2, 2013, pp. 283-315.
Kolesnikov, et al., "FleXOR: Flexible garbling for XOR gates that beats free-XOR", 34th Annual Cryptology Conference, Advances in Cryptology—Crypto, Proceedings, Part II, vol. 8617 of Lecture Notes in Computer Science, Springer, Aug. 17-21, 2014, pp. 1-24.
Kolesnikov, et al., "Improved Garbled Circuit: Free XOR Gates and Applications", 35th International Colloquium on Automata, Languages, and Programming, LNCS, vol. 5126, Springer, Jul. 7-11, 2008, pp. 1-12.
Lecun, et al., "The MNIST Database of Handwitten Digits", URL: http://yann.lecun.com/exdb/mnist/, retrieved on Aug. 29, 2017, Aug. 29, 2017, pp. 1-8.
Lindell, et al., "Privacy Preserving Data Mining", 20th Annual International Cryptology Conference, Advances in Cryptology, Proceedings, Aug. 20-24, 2000, 26 pages.
Livni et al., "On the Computational Efficiency of Training Neural Networks", Annual Conference on Neural Information Processing Systems, Advances in Neural Information Processing Systems, vol. 27, Dec. 8-13, 2014, pp. 1-15.
Malkhi, et al., "Fairplay—A Secure Two-Party Computation System", Proceedings of the 13th USENIX SeC'urity Symposium, Aug. 9-13, 2004, 17 pages.
Naor, et al. "Privacy Preserving Auctions and Mechanism Design", Proceedings of the 1st ACM conference on Electronic commerce, Nov. 1999, 11 pages.
Nikolaenko, et al., "Privacy-Preserving Ridge Regression on Hundreds of Millions of Records", IEEE Symposium on Security and Privacy, May 19-22, 2013, 15 pages.
Phong, et al., "Privacy-Preserving Deep Learning: Revisited and Enhanced", Applications and Techniques in Information Security—8th International Conference, Proceedings, vol. 719 of Communications in Computer and Information Science, Jul. 6-7, 2017, pp. 100-110.
Schneider, et al., "Secure numerical and logical multi party operations", ScienceDirect, Journal of Information Security and Applications, vol. 34, May 13, 2017, 11 pages.
Shokri, et al., "Privacy-Preserving Deep Learning", Proceedings of the 22nd ACM SIGSAC Conference on Computer and Communications Security, Oct. 12-16, 2015, 12 pages.
UCI Machine Learning Repository, "Arcene Data Set", URL: https://archive.ics.uci.edu/ml/datasets/Arcene, UCI Machine Learning Repository, retrieved on Aug. 29, 2017, Aug. 29, 2017, 3 pages.
USPTO, "Notice of Allowance", U.S. Appl. No. 16/937,310, dated Sep. 23, 2020, 15 pages.
Whitney, "Analytic Extensions of Differentiable Functions Defined in Closed Sets", Trans. Amer. Math. Soc., vol. 36, No. 1, 1934, pp. 63-89.
Wu, et al., "Privacy-preservation for Stochastic Gradient Descent Application to Secure Logistic Regression", The 27th Annual Conference of the Japanese Society for Artificial Intelligence, vol. 27, 2013, pp. 1-4.

* cited by examiner

FIG. 4

| $M_{M_{msb},p_{lsb}}$ | Operation | Value |
|---|---|---|
| $M_{6,-2}$ | Input | 001011.10 |
| $M_{6,-4}$ | Extend | 001011.1000 |
| $M_{6,0}$ | Round | 001100 |
| $M_{4,-2}$ | Project | 1011.10 |
| $M_{8,-2}$ | Lift | ??001011.10 |

FIG. 5

Lift Operation: Offline Phase

Input: The mask $\lambda \in 2^{p'_{lsb}}\mathbb{Z}/2^{M_{msb}}\mathbb{Z}$ of a modular real number

Output: Precomputed shares $[\![b]\!]_{M'_{msb}-M_{msb},0}$ and $[\![\nu]\!]_{M'_{msb},p'_{lsb}}$.

1: Set $b = 0$ if $\lambda \in \left[-\frac{2^{M_{msb}}}{4}, \frac{2^{M_{msb}}}{4}\right)$, $b = 1$ if $\lambda \in \left[\frac{2^{M_{msb}}}{4}, \frac{3 \cdot 2^{M_{msb}}}{4}\right)$.

2: $[\![b]\!]_{M'_{msb}-M_{msb},0} = \text{secretShares}(b, \mathcal{M}_{M'_{msb}-M_{msb}})$ 3: Compute $\nu = \text{roundTo}(\text{quartermod}_{2^{M_{msb}}}(\lambda), 2^{p'_{lsb}}) \mod 2^{M'_{msb}}$.

4: $[\![\nu]\!]_{M'_{msb},p'_{lsb}} = \text{secretShares}(\nu, \mathcal{M}_{M'_{msb},p'_{lsb}})$ 5: return $[\![b]\!]_{M'_{msb}-M_{msb},0}$ and $[\![\nu]\!]_{M'_{msb},p'_{lsb}}$.

FIG. 6    Lift Operation: Online Phase

Input: For given parameters $p_{\text{lsb}}, M_{\text{msb}}, p'_{\text{lsb}}, M'_{\text{msb}}$ :

- A pair $([[x]]_{M_{\text{msb}}, p_{\text{lsb}}}, [[\lambda]]_{M_{\text{msb}}, p_{\text{lsb}}}, a = x + \lambda)$ of a secret shared modular real number and a mask for a plaintext $x \in \mathcal{P}_{m, p_{\text{lsb}}}$ and some $m \leq M_{\text{msb}} - 2$,
- Triplet shares $[[b]]_{M'_{\text{msb}} - M_{\text{msb}}, 0}, [[\nu]]_{M'_{\text{msb}}, p'_{\text{lsb}}}$.

Output: Output secret shares $[[x]]_{\text{mod}, M'_{\text{msb}}, p'_{\text{lsb}}}$ of the same plaintext $x$.

1: (if it is not already done) Mask and reveal $a = (x + \lambda) \mod 2^{M_{\text{msb}}}$.
2: Player 1 computes $a_0 = \text{roundTo}(\text{centermod}_{2^{M_{\text{msb}}}}(a), 2^{p'_{\text{lsb}}}) \mod 2^{M'_{\text{msb}}}$.
3: All compute $[[x]]_{M'_{\text{msb}}, p'_{\text{lsb}}} = a_0 + (a_1 - a_0) \boxtimes [[b]]_{M'_{\text{msb}} - M_{\text{msb}}, 0} - [[\nu]]_{M'_{\text{msb}}, p'_{\text{lsb}}}$, where $$a_1 = \text{roundTo}(\text{posmod}_{2^{M_{\text{msb}}}}(a), 2^{p'_{\text{lsb}}}) \mod 2^{M'_{\text{msb}}}$$

4: return $[[x]]_{M'_{\text{msb}}, p'_{\text{lsb}}}$

FIG. 7 Share Refresh Operation ModReal to ModReal: Offline Phase

Input: Parameters params' and params', and a mask $\lambda \in \mathcal{M}_{params'}$.
Output: Precomputed shares $[\![\nu']\!] \in \mathcal{M}_{params'}^k$ of $\nu' := \text{projectAndRound}_{params'}(\lambda)$.
1: Compute $\nu' = \text{projectAndRound}_{params'}(\lambda)$.
2: $[\![\nu']\!] = \text{secretShares}(\nu', \mathcal{M}_{params'})$.
3: return $[\![\nu']\!]$.

FIG. 8 Share Refresh Operation ModReal to ModReal: Online Phase

Input: For given parameters params = $(M_{msb}, p_{lsb})$ and params' = $(M'_{msb}, p'_{lsb})$:
- A secret-shared modReal container $([\![x]\!], [\![\lambda]\!], a = x + \lambda)$ for $x \in \mathcal{P}_{m, p_{lsb}}$ for some $m \leq M'_{msb}$.
- Triplet shares $[\![\nu']\!] \in \mathcal{M}_{params'}^k$.

Output: Output secret shares $[\![z]\!] \in \mathcal{M}_{params'}^k$ of the same plaintext $x$.
1: (if it is not already done) Mask and reveal $a = (x + \lambda) \mod 2^{M_{msb}}$.
2: Player 1 computes $a_{rounded} = \text{projectAndRound}_{params'}(a)$
3: All Compute $[\![z]\!] = a_{rounded} - [\![\nu']\!]$
4: return $[\![z]\!]$

Beaver multiplication on modular backend (Secret-Secret)

Input: Given secret shares $[\![x]\!]_{\mathrm{mod}, M_{\mathrm{msb}}^A, p_{\mathrm{lsb}}^A}$ and $[\![y]\!]_{*, M_{\mathrm{msb}}^B, p_{\mathrm{lsb}}^B}$, working parameters $(M_{\mathrm{msb}}^{AW}, p_{\mathrm{lsb}}^{AW}), (M_{\mathrm{msb}}^{BW}, p_{\mathrm{lsb}}^{BW}), (M_{\mathrm{msb}}^W, p_{\mathrm{lsb}}^W)$ of same width $\eta := M_{\mathrm{msb}} - p_{\mathrm{lsb}}$, and output parameters $(M_{\mathrm{msb}}^z, p_{\mathrm{lsb}}^z)$

Output: Compute secret share $[\![z]\!]_{\mathrm{mod}, M_{\mathrm{msb}}^z, p_{\mathrm{lsb}}^z}$ 1: if $M_{\mathrm{msb}}^{AW} > M_{\mathrm{msb}}^A$ then △ lift A
2:  mask-and reveal $a = x + \lambda$
3:  $[\![a_w]\!] = \mathbf{centermod}_{2^{M_{\mathrm{msb}}^A}}(a) + \mathbf{diffmod}_{2^{M_{\mathrm{msb}}^A}}(a) \cdot [\![b_\lambda]\!] - [\![\nu_\lambda]\!] + [\![\lambda_w]\!]$
4:  reveal $a_w$
5: else if $M_{\mathrm{msb}}^{AW} \le M_{\mathrm{msb}}^A$ and $p_{\mathrm{lsb}}^{AW} > p_{\mathrm{lsb}}^A$ then △ round A
6:  mask-and reveal $a = x + \lambda$
7:  $[\![a_w]\!] = a \mod 2^{M_{\mathrm{msb}}^{AW}} - [\![\nu_\lambda]\!] + [\![\lambda_w]\!]$
8:  reveal $a_w$
9: else △ truncate A
10:  mask-and reveal $a = x + \lambda$
11:  Set $a_w = a \mod 2^{M_{\mathrm{msb}}^{AW}}$
12:  Set each $\lambda_{w,j} = \lambda_j \mod 2^{M_{\mathrm{msb}}^{AW}}$
13: end if
14: Do the same to compute $b_w$ and $\mu_w$
15: compute $[\![z_w]\!] = a_w \times b_w - a_w \times [\![\mu_w]\!] - [\![\lambda_w]\!] \times b_w + [\![\lambda \mu_w]\!]$
16: if $M_{\mathrm{msb}}^z > M_{\mathrm{msb}}^W$ then △ lift output
17:  mask-and reveal $c_w = z_w + \psi_w$
18:  Compute $[\![z]\!] = \mathbf{centermod}_{2^{M_{\mathrm{msb}}^W}}(c_w) + \mathbf{diffmod}_{2^{M_{\mathrm{msb}}^W}}(c_w) \cdot [\![b_\psi]\!] - [\![\nu_\psi]\!]$
19: else △ trunc/round output
20:  Compute $[\![z]\!] = [\![z_w]\!] \mod 2^{M_{\mathrm{msb}}^z}$
21: end if

FIG. 9

Beaver multiplication on modular backend (Secret-Public)

Input: Given secret shares $[\![x]\!]_{\text{mod},M_{\text{msb}}^A,p_{\text{lsb}}^A}$ and a public value $y$, working parameters $(M_{\text{msb}}^{AW}, p_{\text{lsb}}^{AW})$, $(M_{\text{msb}}^{BW}, p_{\text{lsb}}^{BW})$, $(M_{\text{msb}}^{W}, p_{\text{lsb}}^{W})$ of same width, and output parameters $(M_{\text{msb}}^{z}, p_{\text{lsb}}^{z})$

Output: Compute secret share $[\![z]\!]_{\text{mod},M_{\text{msb}}^z,p_{\text{lsb}}^z}$ 1: if $M_{\text{msb}}^{AW} > M_{\text{msb}}^{A}$ then    ▷ lift A
2:   mask-and reveal $a = x + \lambda$
3:   $[\![x_w]\!] = \mathbf{centermod}_{2^{M_{\text{msb}}^A}}(a) \cdot [\![b_\lambda]\!] - [\![\nu_\lambda]\!]$
4:   reveal $a_w$
5: else if $M_{\text{msb}}^{AW} \leq M_{\text{msb}}^{A}$ and $p_{\text{lsb}}^{AW} > p_{\text{lsb}}^{A}$ then   ▷ round A
6:   mask-and reveal $a = x + \lambda$
7:   $[\![x_w]\!] = a \mod 2^{M_{\text{msb}}^{AW}} - [\![\nu_\lambda]\!]$
8:   reveal $a_w$
9: else   ▷ truncate A
10:   Set each $x_{w,j} = x_j \mod 2^{M_{\text{msb}}^{AW}}$
11: end if
12: Convert the public value $y$ to a modreal value $y_w$ of params $(M_{\text{msb}}^{AW}, p_{\text{lsb}}^{AW})$
13: compute $[\![z_w]\!] = [\![x_w]\!] \times y_w$
14: if $M_{\text{msb}}^z > M_{\text{msb}}^W$ then   ▷ lift output
15:   mask-and reveal $c_w = z_w + \psi_w$
16:   Compute $[\![z]\!] = \mathbf{centermod}_{2^{M_{\text{msb}}^W}}(c_w) + \mathbf{diffmod}_{2^{M_{\text{msb}}^W}}(c_w) \cdot [\![b_\psi]\!] - [\![\nu_\psi]\!]$
17: else   ▷ trunc/round output
18:   Compute $[\![z]\!] = [\![z_w]\!] \mod 2^{M_{\text{msb}}^z}$
19: end if

FIG. 11

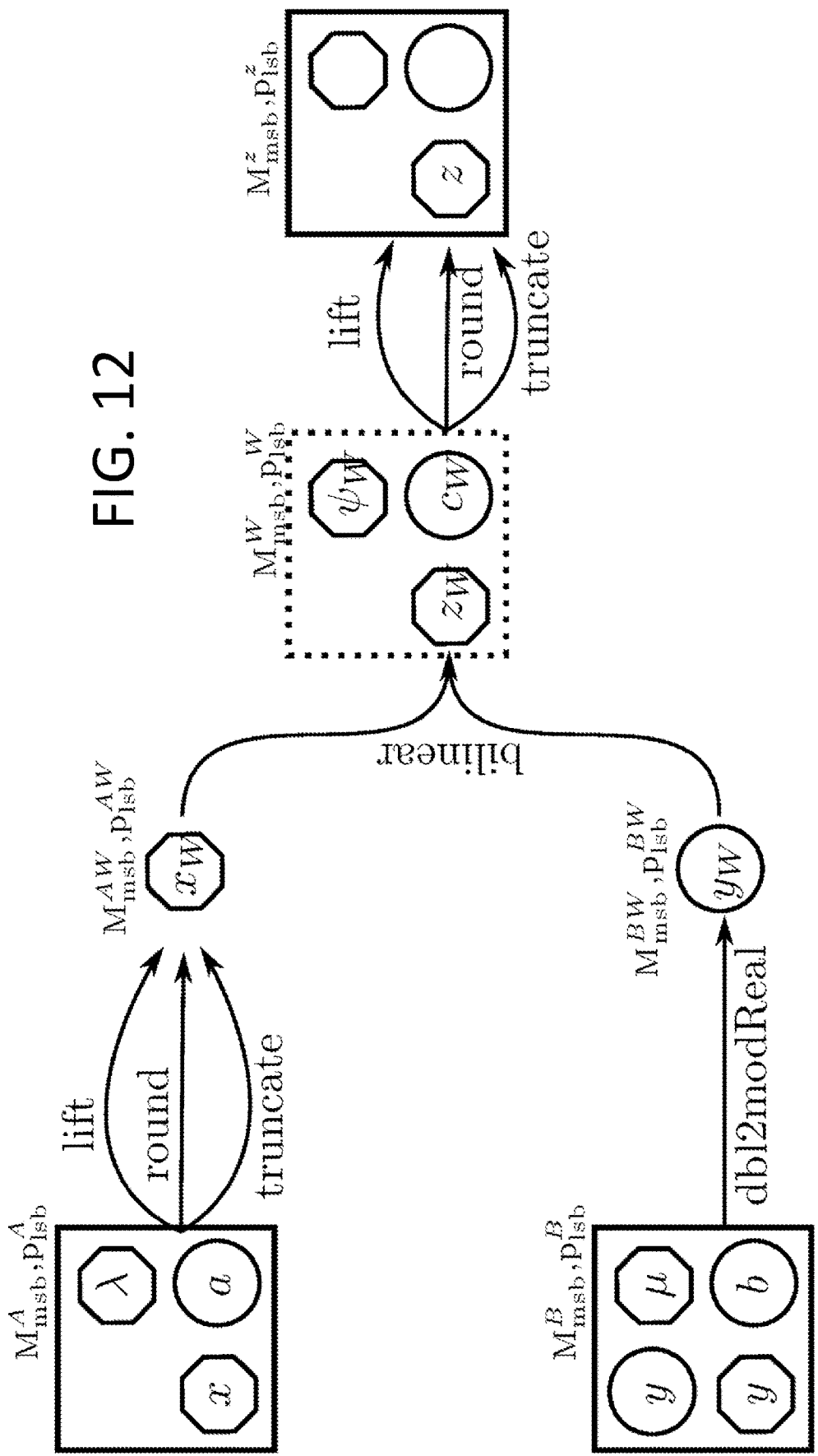

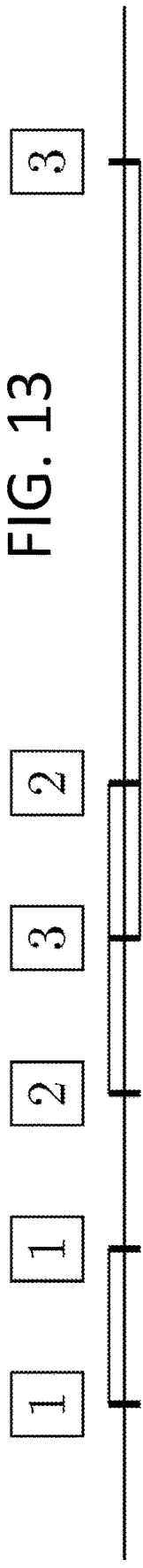
FIG. 13
FIG. 17
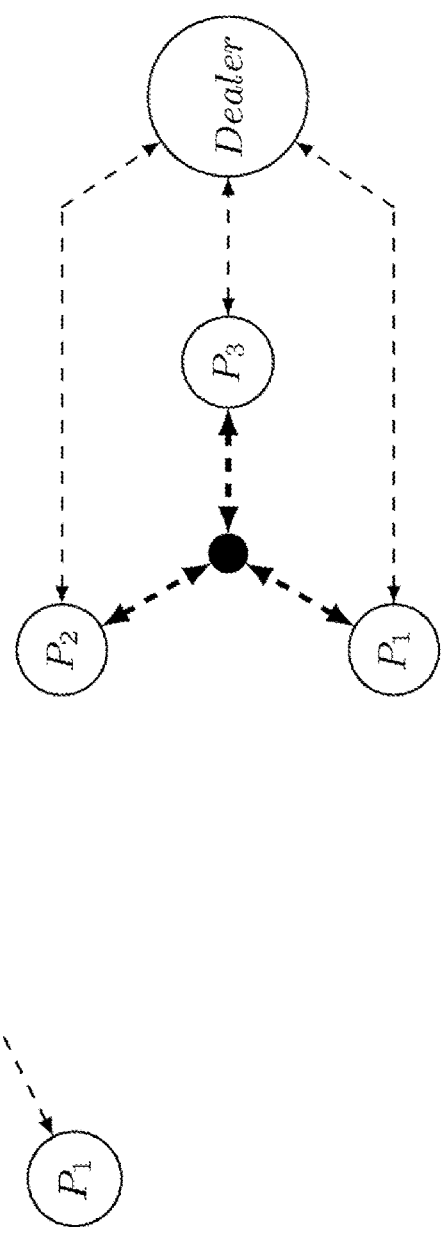
FIG. 16B
FIG. 16A

Linear combination operation with ModReal representation

Input: Input shares $[\![x^{(i)}]\!]$ with associated masking data $[\![\lambda^{(i)}]\!]$ and masked value $a^{(i)}$; coefficients $(\alpha^{(i)}, k^{(i)})$, working parameters $M^w_{\text{msb}}, p^w_{\text{lsb}}$, output parameters $M^z_{\text{msb}}, p^z_{\text{lsb}}$ lift triplets

Output: output shares $[\![z]\!]$ where $z = \sum_{i=1}^{n} \frac{\alpha^{(i)}}{2^{k^{(i)}}} x^{(i)}$ 1: for $i = 1$ to $n$ do
2:   if $M^w_{\text{msb}} > M^{(i)}_{\text{msb}} - k^{(i)}$ then      ▷ lift case
3:     players jointly mask and reveal $a^{(i)} = x^{(i)} + \lambda^{(i)}$
4:     compute $[\![y^{(i)}]\!]_{\text{mod}} = \text{centermod}_{2M^w_{\text{msb}}}(\alpha^{(i)}) \odot [\![b^{(i)}]\!]$ in $\mathcal{M}_{M^w_{\text{msb}} + k^{(i)}, p^w_{\text{lsb}} + k^{(i)}}$.
5:     This reinterprets into $[\![c^{(i)}]\!]_{\text{mod}} = [\![\frac{1}{2^{k^{(i)}}} y^{(i)}]\!]_{\text{mod}}$ in $\mathcal{M}_{M^w_{\text{msb}}, p^w_{\text{lsb}}}$.
6:     compute $[\![u^{(i)}]\!]_{\text{mod}} = \alpha^{(i)} \cdot [\![c^{(i)}]\!] - [\![\nu^{(i)}]\!]$ in $\mathcal{M}_{M^w_{\text{msb}}, p^w_{\text{lsb}}}$.
7:   else
8:     players locally compute $[\![u^{(i)}]\!]_{\text{mod}} = a^{(i)} \cdot [\![\frac{1}{2^{k^{(i)}}} x^{(i)}]\!]_{\text{mod}}$ projected and rounded to $\mathcal{M}_{M^w_{\text{msb}}, p^w_{\text{lsb}}}$ (no triplet is used).
9:   end if
10: end for
11: Players add the shares $[\![u^{(i)}]\!]_{\text{mod}}$ locally for $i \in [1, n]$ to obtain the shares of the result $[\![w]\!]_{\text{mod}}$
12: cast $[\![w]\!]_{\text{mod}}$ to the forced output $[\![z]\!]_{*, M^z_{\text{msb}}, p^z_{\text{lsb}}}$ (using the general cast algorithm)

FIG. 14

ARITHMETIC FOR SECURE MULTI-PARTY COMPUTATION WITH MODULAR INTEGERS

RELATED APPLICATIONS

The subject matter of this application is related to Patent Cooperation Treaty Application PCT/US2020/019551, filed 2020 Feb. 24, U.S. Provisional Application No. 62/809,543, filed on 2019 Feb. 22, and Patent Cooperation Treaty Application No. PCT/US2018/048963, filed on 2018 Aug. 30 and published on 2019 Mar. 7 as World Intellectual Property Organization International Publication Number WO2019046651A2, all of which applications are hereby incorporated by reference in their entireties.

BACKGROUND OF THE INVENTION

Privacy-preserving multi-party computation (MPC) techniques enable multiple parties to collaboratively evaluate a function to produce a shared or revealed output while keeping the inputs private. Such computations are used, for example, in medicine and finance, when the input data comes from distinct private data sources that cannot disclose their data, but a public result based on the confidential data is needed.

A MPC is generally split both temporally and geographically across multiple participants. The participants, each of which represents a separate computing system, typically include k parties and one trusted dealer. As used herein, the terms party and player are used interchangeably and refer to individual party computer systems participating in a multi-party computation.

After compilation of code to implement the computation, the trusted dealer first executes an offline phase of the MPC. In the offline phase, the trusted dealer produces masks (masking data, also referred to as triplets), and distributes shares of these masks to the parties such that each party knows only its share of the mask and none of them know the plaintext mask value represented by a sum of the shares. The determination of the masks typically depends on the data expected to be operated upon from statistical analysis perspective so that the masks are appropriately configured in relation to the data.

The k parties then collaboratively execute an online phase of the MPC, with synchronization steps where parties can exchange or broadcast messages according to a defined MPC protocol. The online phase can be run in a firewalled environment to which the trusted dealer has no access.

A MPC can be the distributed equivalent of a plaintext pseudocode, which we can describe as a single static assignment (SSA) graph of MPC-friendly elementary operations. The nodes of the SSA graph are plaintext variables, and each party gets a local view (or secret share) of the variables. We denote this local view as an MPC container. The MPC-friendly elementary operations are referred to as builtins that take MPC containers and optionally some static parameters, as input and produce MPC containers as output.

FIG. 1 illustrates a schematic of MPC containers for k parties of a multi-party computation. Globally, a MPC container holds all the information about one variable in the SSA, namely, a plaintext value x that can be either public (known by all parties, but not the trusted dealer) or a secret-shared $[\![x]\!]$ (each party knows its share only), one mask $[\![N]\!]$ (known by the dealer, and secret shared among all parties), and the optional masked value a=x+λ (known by all parties, but typically not the dealer). Notation note: the double square bracket notation $[\![\ ]\!]$ is used herein to denote a secret shared value.

Locally, each party has a trace of the MPC container, which can be a structure with fields as follows:
- the public value x (if the container is publicly revealed)
- one share $x_j$ of the public value
- one share $\lambda_j$ of the container's mask
- the masked value a (if the container is masked and revealed).

Analyzing the union of the k containers, the following holds: the plaintext value of the container is by definition the sum of all shares $\Sigma x_j$, if the container is public, all parties know the plaintext value, and each party has this value x populated. In this case, none of the other fields need be used in the MPC protocol. The mask of the container is $\lambda=\Sigma\lambda_1$. The value of the mask is known only by the trusted dealer (during the offline phase). None of the parties knows or learns the actual mask during the online phase. The masked value a is equal to λ+x. The special mask-and-reveal operation instructs each party to broadcast its $x_j+\lambda_j$, which allows them to jointly reconstruct and store the same field a=x+λ. All other technical or local variable that appears in the builtins are called ephemeral variables.

Two prior works have proposed the use of fixed-point integer representations, as opposed to floating-point representations, for representing real numbers in the context of MPC. The first of the prior works will be referred to hereinafter as "SecureML", by P. Mohassel and Y. Zhang, and titled "SecureML: A system for scalable privacy-preserving machine learning", in 2017 IEEE Symposium on Security and Privacy, S P 2017, San Jose, Calif., USA, May 22-26, 2017, pages 19-38, 2017. The second of the prior works will be referred to hereinafter as "ABY³", by P. Mohassel and P. Rindal, and titled "ABY³: A mixed protocol framework for machine learning", in Proceedings of the 2018 ACM SIGSAC Conference on Computer and Communications Security, CCS 2018, Toronto, ON, Canada, Oct. 15-19, 2018, pages 35-52, 2018.

The modReal Representation. In these works, real number arithmetic is implemented through the evaluation of additions, subtractions and rounded divisions on fixed-size integer types (such as int64, that is, integers modulo $2^{64}$). For instance, to multiply two 30-bit integers x and y and retain the 30 most significant bits of the result (analogously to floating point multiplication), one can first compute xy (by fitting the product into a 64-bit integer without any overflows) and then right-shift the result by 30 bits. The two works adapt these operations to the MPC setting where a plaintext $x \in \mathbb{Z}$ is secret-shared among k parties (k=2 in SecureML and k≥3 in ABY³) as $(x_1, \ldots, x_k) \in (\mathbb{Z}/q\mathbb{Z})^k$ (for some integer q), such that x=centermod$_q(x_1+ \ldots +x_k)$. The signed mathematical lift centermod$_q(x)$ is defined to be the unique integer $\tilde{x} \in [-q/2, q/2)$ such that $\tilde{x} \equiv x \pmod{q}$. We denote this particular representation of real numbers on arithmetic shares as the modReal representation.

SecureML, Section 4.1, subsection titled "Arithmetic Operations on Shared Decimal Numbers" suggests as follows. Consider a fixed-point product of two binary decimal numbers x and y stored in a common integer representation such that $\ell_D$ bits of each number are defined to represent the fractional part of the number (binary digits after the decimal point). In this case, $x'=2^{\ell_D}x$ and $y'=2^{\ell_D}y$ will be integers that can be natively represented using an integer back-end. The product z=x'y', with the multiplication taking place in $\mathbb{Z}/2^\ell\mathbb{Z}$ for some integer $\ell$, however, will have up to $2\ell_D$ bits in the fractional part of the representation. It may not be practical, however, to maintain the additional binary digits after the decimal, particularly in the context of a MPC. SecureML suggests to decrease the number of bits representing the fractional part in the result by ignoring or truncating the last $\ell_D$ bits. For example, the product can be represented as: $z = 2^{\ell_D} z_1 + z_0$ where $0 \leq z_0 < 2^{\ell_D}$, and consider the result to include only $z_1 = \lfloor z/2^{\ell_D} \rfloor$.

SecureML then extends above truncation technique to a secret shared value $[\![z]\!]$. In effect, two parties holding respective secret shares of $[\![z]\!]$ can truncate their individual shares. It is then shown in Theorem 1 that with high probability, the two truncated shares can reconstruct the truncation $\lfloor z/2^{\ell_D} \rfloor$ of z. This solution relies on the following premise: if $x_1$ and $x_2$ are two secret shares of a very small x, then with very high probability, the two shares $x_1$ and $x_2$ are in the two opposite half circles mod $2^{\ell}$. The solution, which only works with two parties, relies on a local procedure to truncate the shares, but has a non-zero probability that the resulting secret shared value will be incorrect.

$ABY^3$ addresses the limitations of the SecureML two party truncation technique in § 5.1.1, and § 5.2.2 presents additional techniques for truncation that extend to three or more parties in a MPC setting. Again, however, these additional techniques have a non-negligible probability of failure in practice.

In the two prior works, multiplication is performed using Beaver triplets modulo q. Rounding can be performed locally on each share (at a price of a small error on the plaintext value bounded by $\sqrt{k}/2$), and addition can be done locally at each share. Two variants for division are proposed: the first one, in SecureML, is a two party solution without communication between the two parties and the second one, in ABY3 is a Beaver triplet-based solution for k parties. In both cases, the result of the division is correct most of the time; yet, a huge undetectable overflow occurs with some small, but non-zero probability. The overflow probability for a plaintext range of M integer elements and shares modulo q is M/q. In the above-mentioned example of multiplying two 30-bit integers, the overflow probability is 2⁶¹/2⁶⁴=1/8 and drops down to 2⁴¹/2⁶⁴ if we reduce the precision to 20 bits. When it occurs, the overflow is large (the overflow amplitude has been mitigated since SecureML, yet, it still changes the most significant bits of the result in the new ABY3 revision). Thus, any aggregate function that includes these wrong values gets affected. The overflow probability is per-coefficient, so if we do a computation on a vector or a matrix of N coefficients (as is the case for most ML use-cases such as logistic regression, linear regression, neural nets), the presence of at least one destructive overflow gets multiplied by N and becomes non-negligible.

The two possible counter-measures proposed by the two prior works to deal with millions of coefficients are either to reduce the precision (provide at most 10 bits of precision on a 64-bit backend), or to increase the backend-size to e.g. 128-bits (4 to 16 times slower). Note that 10 bits of fixed point precision can be enough in numerically stable use-cases, where we know the exact distribution of the plaintext (e.g. feature-scaled input, output of a sigmoid etc.). However, we can also encounter major underflow situations if the fixed point exponent is estimated 4 or 5 bits higher than the actual values, because of an uncertainty on the secret plaintext distribution.

SUMMARY OF THE INVENTION

In the context of a secure multi-party computation, a secret shared value jointly stored by multiple parties in a first modular representation is cast into a second modular representation having a larger most significant bit. The cast includes a trusted dealer secret sharing with the parties a masking value the range of which is divided into two halves. The parties use the masking value to mask and reveal a sum of the secret shared value and the masking value. The trusted dealer also secret shares with the parties a bit encoding the half of the range that contains the masking value. The parties use the secret shared bit along with the sum to collaboratively reconstruct a set of secret shares representing the secret shared value in the second modular format. In contrast with previous work, the disclosed solution eliminates a non-zero probability of error without sacrificing efficiency or security. This method is described in additional detail in section 3.1 of the detailed description below.

A method can be performed by a secure multi-party computing system (SMPCS) configured for performing multi-party computations on secret shared values, where the SMPCS includes a trusted dealer computing system and a plurality of party computing systems in secure networked communication. The method is for casting a secret shared value from a first modular representation to a second modular representation, wherein the first modular representation has a range defined by a most significant bit position and a least significant bit position of the first modular representation, and wherein the second modular representation has a range defined by a most significant bit position and a least significant bit position of the second modular representation, and wherein the most significant bit position of the second modular representation is greater than the most significant bit position of the first modular representation.

In accordance with one embodiment, each of the party computing systems stores a respective secret share of the secret shared value in the first modular representation. The trusted dealer computing system stores a masking value and communicates to each of the party computing systems a respective secret share of the masking value in the first modular representation so that the masking value is secret shared between the party computing systems in the first modular representation. The trusted dealer computing system: determines a subrange in which the masking value resides, wherein the subrange is selected from a plurality of predetermined non-overlapping subranges representing the range of the first modular representation; encodes the determined subrange into a numerical subrange identifier, and communicates to each of the party computing systems a respective secret share of the numerical subrange identifier so that the numerical subrange identifier is secret shared between the party computing systems. The trusted dealer computing system transforms the masking value, in a first transformation, into a transformed masking value by at least performing a first mathematical lift on the masking value. The trusted dealer computing system communicates to each of the party computing systems a respective secret share of the transformed masking value in the second modular representation so that the transformed masking value is secret shared between the party computing systems in the second modular representation. The party computing systems collaboratively compute and reveal a sum of the secret shared value and the masking value as a masked value without revealing the secret shares of the secret shared value or the secret shares of the masking value.

The SMPCS transforms the masked value, in a second transformation, into a first transformed masked value by at least performing a second mathematical lift on the masked value. The SMPCS transforms the masked value, in a third transformation, into a second transformed masked value by at least performing a third mathematical lift on the masked value, wherein the first mathematical lift, the second mathematical lift and the third mathematical lift are each different from one another. The party computing systems collaboratively compute the secret shared value in the second modular representation such that each of the party computing systems computes a respective secret share of the secret shared value in the second modular representation based on: the first transformed masked value, the second transformed masked value, for each party computing system, the respective secret share of the numerical subrange identifier, and for each party computing system, the respective secret share of the transformed masking value.

The method can be performed wherein the first mathematical lift and the second mathematical lift produce values relative to each other that are offset by one quarter of the range of the first modular representation, and wherein the second mathematical lift and the third mathematical lift produce values relative to each other that are offset by one half of the range of the first modular representation.

The method can be performed wherein the first mathematical lift, the second mathematical lift, and the third mathematical lift are each selected from the group consisting of: a quartermod lift parameterized by $2^{M_{msb}}$, where ($M_{msb}$–1) is the most significant bit position of the first modular representation, a centermod lift parameterized by $2^{M_{msb}}$, and a posmod lift parameterized by $2^{M_{msb}}$.

The method can be performed wherein the first mathematical lift is a quartermod lift on the masking value parameterized by $2^{M_{msb}}$, wherein the second mathematical lift is a centermod lift on the masked value parameterized by $2^{M_{msb}}$, wherein the third mathematical lift is a posmod lift on the masked value parameterized by $2^{M_{msb}}$, and where ($M_{msb}$–1) is the most significant bit position of the first modular representation.

The method can be performed wherein a quartermod lift on x parameterized by $2^M$ is defined as a unique real $$\tilde{x} \in \left[-\frac{2^M}{4}, \frac{3 \cdot 2^M}{4}\right)$$

such that $\tilde{x} - x \in 2^M \mathbb{Z}$, wherein a centermod lift on x parameterized by $2^M$ is defined as a unique real $$\tilde{x} \in \left[-\frac{2^M}{2}, \frac{2^M}{2}\right)$$

such that $\tilde{x} - x \in 2^M \mathbb{Z}$, and wherein a posmod lift on x parameterized by $2^M$ is defined as a unique real $\tilde{x} \in [0, 2^M)$ such that $\tilde{x} - x \in 2^M \mathbb{Z}$.

The method can be performed wherein the first transformation further includes: rounding a result of the first mathematical lift to a nearest multiple of $2^{P'_{lsb}}$, where $P'_{lsb}$ is the least significant bit position of the second modular representation, and taking a modulo $2^{M'_{msb}}$ of the rounding, where ($M'_{msb}$–1) is the most significant bit position of the second modular representation; wherein the second transformation further includes: rounding a result of the second mathematical lift to a nearest multiple of $2^{P'_{lsb}}$, and taking a modulo $2^{M'_{msb}}$ of the rounding; and wherein the third transformation further includes: rounding a result of the third mathematical lift to a nearest multiple of $2^{P'_{lsb}}$, and taking a modulo $2^{M'_{msb}}$ of the rounding.

The method can be performed wherein the first transformation, the second transformation and the third transformation each includes projecting a result of the associated mathematical lift onto $\mathbb{R}/2^{M'_{msb}}\mathbb{Z}$, where ($M'_{msb}$–1) is the most significant bit position of the second modular representation.

The method can be performed wherein the "plurality of predetermined non-overlapping subranges" consists of two equally sized subranges, and wherein the numerical subrange identifier is selected from a group consisting of the numbers 0 and 1.

The method can be performed wherein the secret shared numerical subrange identifier is used by the party computing systems collaboratively to select between the first transformed masked value and the second transformed masked value for use in calculating the secret shared value in the second modular representation.

The method can be performed wherein the first modular representation and the second modular representation are fixed point integer representations of real numbers.

A method can be performed by a SMPCS configured for performing multi-party computations on secret shared values, where the SMPCS includes a plurality of party computing systems in secure networked communication. The method is for casting a secret shared value from a first modular representation to a second modular representation, wherein the first modular representation has a range defined by a most significant bit position and a least significant bit position of the first modular representation, and wherein the second modular representation has a range defined by a most significant bit position and a least significant bit position of the second modular representation, and wherein the most significant bit position of the second modular representation is greater than the most significant bit position of the first modular representation.

In accordance with one embodiment, each of the party computing systems stores a respective secret share of the secret shared value in the first modular representation. The SMPCS communicates to each of the party computing systems a respective secret share of a masking value so that the masking value is secret shared between the party computing systems. The SMPCS communicates to each of the party computing systems a respective secret share of an indication of a subrange in which the masking value resides, wherein the subrange is selected from a plurality of predetermined non-overlapping subranges representing the range of the first modular representation, so that the subrange indication is secret shared between the party computing systems. The SMPCS transforms the masking value, in a first transformation, into a transformed masking value by at least performing a first mathematical lift on the masking value. The SMPCS communicates to each of the party computing systems a respective secret share of the transformed masking value in the second modular representation so that the transformed masking value is secret shared between the party computing systems in the second modular representation. The party computing systems collaboratively compute and reveal a sum of the secret shared value and the masking value as a masked value without revealing the secret shares of the secret shared value or the secret shares of the masking value. The SMPCS transforms the masked value, in a second transformation, into a first transformed masked value by at least performing a second mathematical lift on the masked value. The SMPCS transforms the masked value, in a third transformation, into a second transformed masked value by at least performing a third mathematical lift on the masked value, wherein the first mathematical lift, the second mathematical lift and the third mathematical lift are each different from one another. The party computing systems collaboratively compute the secret shared value in the second modular representation such that each of the party computing systems computes a respective secret share of the secret shared value in the second modular representation based on: the first transformed masked value, the second transformed masked value, for each party computing system, the respective secret share of the subrange indication, and for each party computing system, the respective secret share of the transformed masking value.

The method can be performed wherein the first transformation, the second transformation and the third transformation each includes projecting a result of the associated mathematical lift onto $\mathbb{R}/2^{M'_{msb}}\mathbb{Z}$, where ($M'_{msb}$−1) is the most significant bit position of the second modular representation.

The method can be performed wherein the "plurality of predetermined non-overlapping subranges" consists of two equally sized subranges, and wherein the numerical subrange identifier is selected from a group consisting of the numbers 0 and 1.

The method can be performed wherein the secret shared numerical subrange identifier is used by the party computing systems collaboratively to select between the first transformed masked value and the second transformed masked value for use in calculating the secret shared value in the second modular representation.

The method can be performed wherein the first modular representation and the second modular representation are fixed point integer representations of real numbers.

A method for performing a multiplication of a first secret shared value stored in a respective initial modular representation and a second secret shared value stored in a respective initial modular representation, can include: casting, in accordance with any one of the foregoing methods for casting, at least one of the first secret shared value and the second secret shared value into a common modular representation such that both the first secret shared value and the second secret shared value are stored in the common modular representation; and performing a beaver multiplication on the first secret shared value and the second secret shared value in the common modular representation.

A method for combining a plurality of secret shared values, each being stored in a respective initial modular representation, and a corresponding plurality of static coefficients can include: casting, in accordance with any one of the foregoing methods for casting, at least one of the plurality of secret shared values into a common modular representation such that all of the plurality of secret shared values are stored in the common modular representation; and performing a linear combination on the plurality of secret shared values stored in the common modular representation and the corresponding plurality of static coefficients.

A method of evaluating a continuous function on a secret shared value can include: selecting a Fourier series, based on the secret shared value, from a plurality of determined Fourier series, wherein each of the plurality of determined Fourier series is configured to approximate the continuous function on an associated subinterval of a domain of the continuous function; based on the selection, casting, in accordance with any one of the foregoing methods for casting, the secret shared value from a first modular representation to a second modular representation; and approximating a value of the continuous function on the secret shared value in the second modular representation using the selected Fourier series.

A system can include a plurality of computer systems configured to perform any one of the foregoing methods.

A non-transitory computer-readable medium can be encoded with computer code that, when executed by a plurality of computer systems, causes the plurality of computer systems to perform any one of the foregoing methods.

BRIEF DESCRIPTION OF THE DRAWINGS

FIG. 4 illustrates an example application of each of the four casting operations on an example input value.

FIG. 5 illustrates a pseudocode implementation of an offline phase of the Lift operation.

FIG. 6 illustrates a pseudocode implementation of an online phase of the Lift operation.

FIG. 7 illustrates a pseudocode implementation of an offline phase of the Share Refresh operation.

FIG. 8 illustrates a pseudocode implementation of an online phase of the Share Refresh operation.

FIG. 9 illustrates a pseudocode implementation of a Beaver multiplication operation on two secret shared values in modular representation.

FIG. 11 illustrates a pseudocode implementation of a Beaver multiplication operation on one secret shared value in modular representation and one public value.

FIG. 12 illustrates a schematic of the Beaver multiplication operation.

FIG. 13 illustrates an example input upon which a cleaning step can be performed.

FIG. 14 illustrates a pseudocode implementation of a Linear combination operation with ModReal representation.

FIG. 16A shows the communication channels for a trusted dealer model.

FIG. 16B communication channels for the honest but curious model.

FIG. 17 illustrates a schematic of communication channels between parties during an online phase.

DETAILED DESCRIPTION

Figure 1:
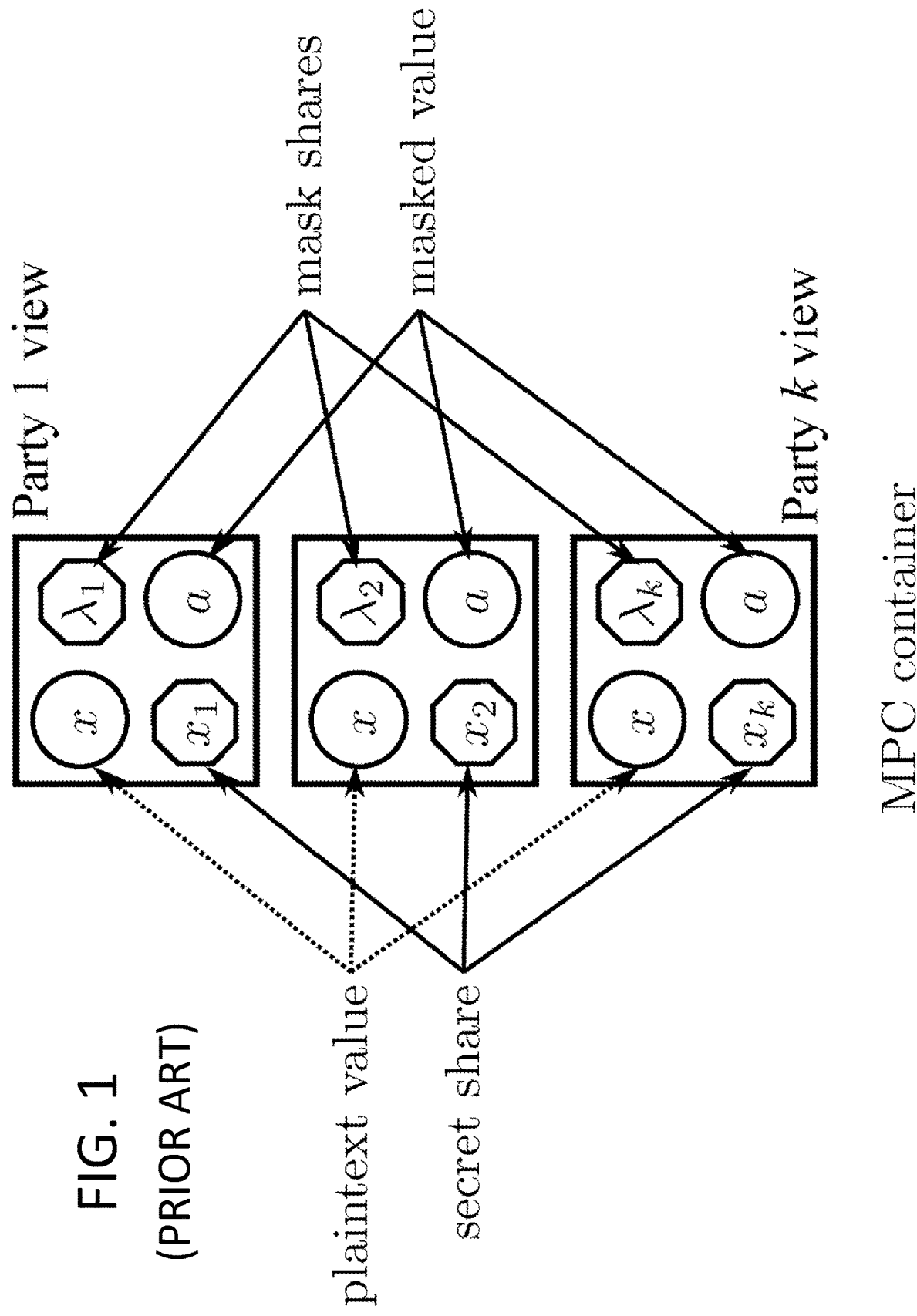
FIG. 1 illustrates a schematic of MPC containers.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

1 Overview

In this disclosure, we present novel techniques for performing real number arithmetic with high numerical precision using modular integer representations in a multi-party computation (MPC) setting. In particular, we disclose a method for casting a secret shared value stored in a first modular representation to a second modular representation. In contrast with the previous work, the disclosed solution advantageously eliminates errors without sacrificing efficiency and security, which is important for machine learning techniques such as linear and logistic regressions.

We adopt a full-threshold security model for MPC and split computations into offline and online phases. The offline phase (independent of the input data) can be performed either by a trusted dealer or by an honest-but-curious dealer. Stronger models and verifiability of this phase can be achieved via standard techniques such as oblivious transfer and cut-and-choose. The online phase computes additive shares of the result.

In our work, we keep the same definition of the shares as in the prior work, but we modify the triplet (masking value) definition by adding a small term that eliminates completely the overflow (as long as $M/q \leq 1/2$). The method keeps a single round of communication during the online phase and adds only a few binary operations that preserve the overall running time. The new method is always correct, the security is unconditional and it works for any number of parties.

To briefly summarize, the overflow in $ABY^3$ comes from the fact that during the division operation, for example, one has to reconstruct the small plaintext $x \in Z$ from a random mask $r'$ mod $q$ (chosen during the offline phase) and a masked value $a=x'-r'$ mod $q$. The latter is revealed during the online phase before applying a division operation that is incompatible with the classes mod $q$. In order to do that, both $r'$ and $a$ are implicitly lifted to integers in $[-q/2, q/2)$. More precisely, in $ABY^3$ § 5.1.1, 5.1.2, these two implicit centered lifts occur during two operations: 1) in the definition of the triplet $r=r'/2^d$ where $r' \in Z/qZ$ is random and 2) in the reveal $x'-r' \in Z/qZ$ and locally compute $(x'-r')/2^d$ operation. These two lifts are not always compatible with the further assumption that $a-r'$ is equal to $x'$ over the reals (the equality may differ by $+q$ or $-q$ with small probability). In our new setting, we preserve the full range of $r'$, which ensures unconditional security. Yet, we split the group $Z/qZ$ in two halves, and during the offline phase, we secret share an additional bit encoding the half group that contains $r'$ and add this secret shared bit to the same triplet. Each half-group corresponds to a different lift for $a-r'$ so the parties can compute both lifts and then use the shared bit to obliviously select the right one during the online phase.

2 Representations of Plaintext Values and Secret Shares

2.1 Floating and Fixed-Point Representations

A plaintext real value x can be represented in floating-point form as $x = m \cdot 2^e \in \mathbb{R}$ where The mantissa m is normalized so that $1/2 \leq |m| < 1$, and The exponent $e \in Z$ (data dependent).

This representation is clearly data-dependent in the sense that both m and e depend on the plaintext value x. In particular, the value of the exponent e is precisely $\lceil \log_2 |x| \rceil$. Since the floating-point representation needs information about the size of x to determine the exponent e, it is data dependent and not MPC friendly, as this value e is not known by the compiler prior to a multi-party computation.

A plaintext real value x can also be represented in fixed-point (integer) form as $x = m \cdot 2^e \in \mathbb{R}$ where The mantissa m is normalized so that $1/2 \leq |m| < 1$, and The exponent $e \in Z$ (public value).

From the compiler's perspective prior to commencing a multi-party computation, the exponent can be regarded or treated as public whereas the mantissa can be treated as private. Since the compiler does not know the secret number x before the computation, it is impossible for the compiler to determine the exact e that guarantees the above normalization for m. This representation is not suitable either since it can easily overflow or underflow as shown in the following two examples:

Overflow. Suppose that we are multiplying the following two numbers (in binary): $x=10.1_{(2)}$ and $y=10_{(2)}$. Both of these have exponent 2. Yet, if the precomputed public exponent of the result is still two, the computation will overflow since: $x \times y = 101_{(2)}$. Thus, we need an exponent of at least 3 to avoid the overflow.

Underflow. Suppose that we are in a scenario where the number of bits in the mantissa is bounded (say 4 bits) and we would like to compute $x^2=1.1_{(2)} \times 1.1_{(2)} = 10.01_{(2)}$. If our pre-computed exponent were 3 instead of 2, with this limitation, we will lose precision, namely, the result will be $010.0_{(2)}$ instead of $10.01_{(2)}$.

We thus adopt an intermediate method where we bookkeep a sufficiently good bound on the exponent for each value in the program. This bound can be estimated statically, by certain statistical analysis, via a special purpose compiler. This method keeps track of public bounds, as precisely as possible, on the secret value, without revealing the secret value itself. From that point of view, our real number representation is hybrid by combining features of both fixed point and floating point numbers.

From the compiler's perspective, the exponent can be considered to be public whereas the mantissa can be regarded as private. Yet, as the compiler certainly does not know the secret number x, it is impossible for the compiler to determine the exact exponent e that guarantees the above normalization for m, but only an upper bound.

2.2 Hybrid Plaintext Representation of Reals

We introduce the following parameters for representing real numbers in a fixed-point (integer) representation:

$p_{lsb}$ denotes the bit position of the least-significant bit;

$(p_{msb}-1)$ denotes the bit position of the most-significant bit;

$\rho = p_{msb} - p_{lsb}$ denotes the plaintext numerical window, i.e. the fixed-point precision.

The parameters $p_{msb}$ and $p_{lsb}$ can be determined by the compiler based on statistical analysis of data expected to be operated upon. In practice, the limiting factor is the size of the numerical window $\rho$ (that is, the number of bits of the mantissa m; equivalently, the difference between the exponent bound kept by the compiler and the number of binary digits in the fractional part to be kept). The smaller the $\rho$ is, the more efficient the arithmetic is on the backend. Thus, the static analysis needs to ensure the following two conditions:

The statically determined bound is sufficient to avoid overflows.

The bound is as precise as possible to avoid loss in precision (given the limitation on $\varphi$.

Definition 1 (integer representation of real numbers). Given parameters $p_{msb}$ and $p_{lsb}$, the class of plaintext values represented using these parameters is denoted by $\mathcal{P}_{p_{msb},p_{lsb}}$ and is defined to be:

$$\mathcal{P}_{p_{msb},p_{lsb}} = \{x \in 2^{p_{lsb}} \cdot Z, |x| < 2^{p_{msb}}\} \subset \mathbb{Q}$$

For example, x=1 will have $p_{msb}$=1, x=3 has $p_{msb}$=2. Note that the class $\mathcal{P}_{Pmsb,Plsb}$ represents all real (in this case, rational) numbers strictly between $2^{Pmsb}$ and $2^{Pmsb}$ with step $2^{Pmsb}$. Note that $p_{lsb}$ is often negative (when we want to compute exact integral parts and a few bits of precision from the fractional parts), but in general, this need not be the case. Negative $p_{lsb}$, means that we are considering bits for the fractional part. The $\rho=p_{msb}-p_{lsb}$ essentially tells us how many bits we need to represent the number. The more negative $p_{lsb}$, the higher precision you have on the float and the more bits you need to represent it.

Example 1. For $p_{msb}$=40 and $P_{lsb}$=−10, we have p=40−(−10)=50. In this case, the least significant bit would be in position −10 and the most significant bit would be in position 39, with the least significant non-fractional bit in position 0.

Example 2. For $p_{lsb}$=−2 and $p_{msb}$=5, the number x=11.5=½+1+2+8 is represented as binary as $1011.1_{(2)}$ and in $\mathcal{P}_{5,-2}$ as $01011.10_{(2)}$. In this case, two fractional bits would occupy the bit positions −2 and −1, while the non-fractional bits would occupy positions 0 through 4.

Notice that a given real number can belong to many different plaintext classes (i.e., 11.5 in the above example belongs to $\mathcal{P}_{5,-2}$ but it also belongs to $\mathcal{P}_{5,-10}$ as well as $\mathcal{P}_{10,-2}$).

Figure 2:
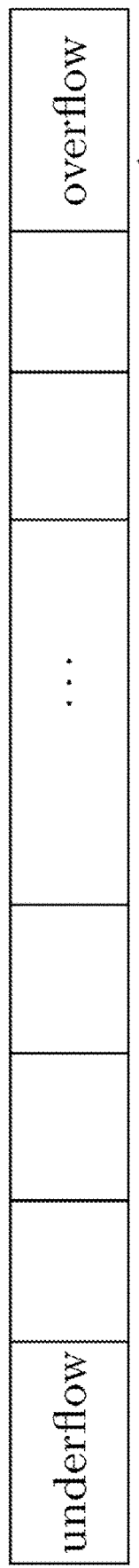
FIG. 2 illustrates the relationship between bits in a fixed point representation.

FIG. 2 illustrates the relationship between the bits $p_{msb}$ and $p_{lsb}$ in a fixed point representation and the associated bits that would be affected in underflow and overflow conditions.

Plaintext overflow. The set $\mathcal{P}_{Pmsb,Plsb}$ is neither a group nor a ring; in particular, it is not stable under the real arithmetic operations such as addition, subtraction, multiplication, etc. For example, the number 3 belongs to $\mathcal{P}_{2,0}$, but 3+3, −3−3 and 3×3 all exceed the bound $2^{Pmsb}$. More generally, we call plaintext overflow any case where the result of an expression exceeds the $2^{Pmsb}$ of the output plaintext set.

To avoid the risk of plaintext overflow, we ensure $p_{msb}$ is at least $\log_2(x)$. But the parameters $p_{msb}$ and $p_{lsb}$ of a variable have to be specified at compile time (before knowing the actual value of the value x), so to mitigate the risk, we need to set $p_{msb}$ to be an upper bound for all possible values. This ensures that no overflow occurs when assigning the actual value to the variable. This also means that the actual (or floating-point) precision is always smaller than the fixed-point precision $p_{msb}-p_{lsb}$ Plaintext underflow. If the fixed exponent is chosen to be too large, it is possible to completely lose the plaintext information. For example, if x=1×10⁻³ and y=6×10⁻⁶, xy=6×10⁻⁶ then for the floating point representation one decimal digit is enough to represent the mantissa of the product and the computed exponent is $\lceil \log_2(x) \rceil$=−18.

On the other hand, in the fixed-point world, if the plaintext parameters of the inputs have been set to ($p_{msb}$, $p_{lsb}$)=(0, 14) which corresponds to 4 decimal digits of precision, a common mistake would be to assume that the product $p_{msb}$ is the sum of the two inputs $p_{msb}$, and here, expect a result of the same 14 bits of fixed-point precision, so with parameters ($p_{msb}$, $p_{lsb}$)=(0,−14): in this case, the result is computed as: 0.0010×0.0060=0.0000 which completely loses the result. Such cases are called plaintext underflow, and although we effectively have 14 bits of fixed point precision in this example, the computed result is completely wrong from a floating point perspective.

2.3 ModReal—Modular Representation of Real Numbers

The ModReal representation refers to a modular integer representation real arithmetic, which can be based on 64-bit or 128-bit integers, for example. This representation can use the fixed point unit of a computer processor with a fixed-point representation of real numbers, having a fixed number of binary digits after the decimal point.

To achieve security in multi-party computations, plaintext values of a certain size are secret shared to share values that typically belong to a class of values with larger parameters. In addition, secret shares are masked by values from the larger class. These larger secret shares classes are parametrized by two integers $M_{msb}$ and $p_{lsb}$. We voluntarily use the same symbol $p_{lsb}$, because in all cases, it matches the plaintext least significant position; however, the parameter $M_{msb}$ used for secret shared data will typically be larger than the $p_{msb}$ used for the corresponding plaintext.

$p_{lsb}$ denotes the bit position of the least-significant bit of the masks/shares;

($M_{msb}$−1) denotes the bit position of the most significant bit of the masks/shares.

Definition 2 (modular representation of real numbers). Given parameters $M_{msb}$ and $p_{lsb}$, the class used for modular representation of secret shares of real numbers is defined as the finite abelian group $$\mathcal{M}_{M_{msb},p_{lsb}} = 2^{p_{lsb}} \mathbb{Z} / 2^{M_{msb}} \mathbb{Z}$$

Note that $\mathcal{M}_{M_{msb},p_{lsb}}$ is isomorphic (as an abelian group) to ($\mathbb{Z}/2^{M_{msb}-P_{lsb}}\mathbb{Z}$,+) and has a natural $\mathbb{Z}$-module structure that we will use.

The important property of the class $\mathcal{M}_{M_{msb},p_{lsb}}$ (unlike the set of all real numbers $\mathbb{R}$) that will ultimately allow us to achieve information-theoretic security properties of the MPC computations is that it admits a uniform distribution.

Example. For $p_{lsb}$=−2 and $p_{msb}$=6, the number x=11.5=1/2+1+2+8 is represented as binary as 1011.1 and in $\mathcal{M}_{6,-2}$ as 001011.10. The opposite number x'=−11.5=52.5=1/2+4+16+32 mod 64 is represented as binary as 110100.1 and in $\mathcal{M}_{6,-2}$ as 110100.10. Note that the bits of the integer parts of x and x' are opposite. The first bit gives the sign of the number: if the first bit is 0 then the number is positive, else it is negative.

2.4 ModReal Mathematical Lifts

Before we define the notion of secret shares, we present several natural lifts of the torus $\mathbb{R}/2^M\mathbb{Z}$ (for a positive integer M) to $\mathbb{R}$ (the real numbers) that will be used throughout. Here, a lift means a section of the natural surjection $\mathbb{R} \twoheadrightarrow \mathbb{R}/2^M\mathbb{Z}$. We define four mathematical lifts that go from $\mathcal{M}_{M_{msb},p_{lsb}}$ to $\mathbb{R}$ that are parametrized by an integer $2^M$ as follows:

centermod$_{2^M}$(x) is defined as the unique real number $$\tilde{x} \in \left[-\frac{2^M}{2}, \frac{2^M}{2}\right)$$

such that $\tilde{x}-x \in 2^M\mathbb{Z}$ posmod$_{2^M}$(x) is defined as the unique real $\tilde{x} \in [0, 2^M)$ such that $\tilde{x}-x \in 2^M\mathbb{Z}$ quartermod$_{2^M}$(x) is defined as the unique real $$\tilde{x} \in \left[-\frac{2^M}{4}, \frac{3 \cdot 2^M}{4}\right)$$

such that $\tilde{x}-x \in 2^M\mathbb{Z}$ diffmod$_{2^M}$(x) is defined as posmod$_{2^M}$(x)−centermod$_{2^M}$(x). This difference is either 0 or $2^M$ depending on which half space x belongs to.

2.5 Modular Representation of Shares

The modular representation can be used advantageously to represent shares of a secret-shared real number.

Definition 3 (modular representation of secret shares). In one embodiment, a number $x \in \mathcal{P}_{p_{msb},p_{lsb}}$ is secret shared in the class $\mathcal{M}_{M_{msb},p_{lsb}}$ as $[\![x]\!]_{M_{msb},p_{lsb}} = (x_1, \ldots, x_k) \in \mathcal{M}_{M_{msb},p_{lsb}}^k$ if $$x = centermod_{2^{M_{msb}}}\left(\sum_{j=1}^{k} x_j\right)$$

The share is correct and unconditionally secure if $\log_2 |x| < M_{msb} - 1$, which condition is met when $M_{msb} \geq p_{msb} + 1$.

Advantages of a modular representation over a non-modular representation of MPC shares can be shown by example.

Example 1. We first consider the case of a non-modular representation of each share using the above non-modular class $\mathcal{P}_{p_{msb},p_{lsb}}$. The plaintext integer 42 can be secret-shared among three parties as [33,97,-88] in $\mathcal{P}_{7,0}$, or as [164301,-806845,642586] in $\mathcal{P}_{20,0}$. In both cases, we need all the three shares to recompute the exact plaintext integer. In the first scenario, however, the sum of the first two shares is quite large compared to $2^7 = 128$, and gives a strong indication that the plaintext integer is positive. The problem is mitigated in the second example, which uses a larger $p_{msb}$ but at the cost of a larger representation.

Example 2: We next consider the same integer 42 as secret-shared among three parties as [33,97,40] in $\mathcal{M}_{7,0}$. We need all the three shares to recompute the exact integer plaintext, but this time, since $\mathcal{M}_{7,0}$ is a group and has a uniform distribution, the first two shares give no information at all on the plaintext value. The security of such shares, for a coalition of k−1 parties out of k is information theoretic.

3 Casting Operations

In order to support basic arithmetic operations such as addition and multiplication on secret shared real numbers represented in modular integer form, we need to first ensure that the two operands can be cast in compatible classes (plaintext and secret shares classes). It is thus important to enable casting operations to efficiently transform a representation with respect to a given set of parameters to a representation with respect to another set of parameters. In this section, we explain how to transform a set of modular shares from a given class $\mathcal{M}_{M_{msb},p_{lsb}}$ into another set of modular shares from another class $\mathcal{M}_{M'_{msb},p'_{lsb}}$ with different parameters $M'_{msb}$, $p'_{lsb}$. The casting operations may or may not require communication depending on whether we decrease or increase the parameters $p_{lsb}$ and $M_{msb}$.

Figure 3:
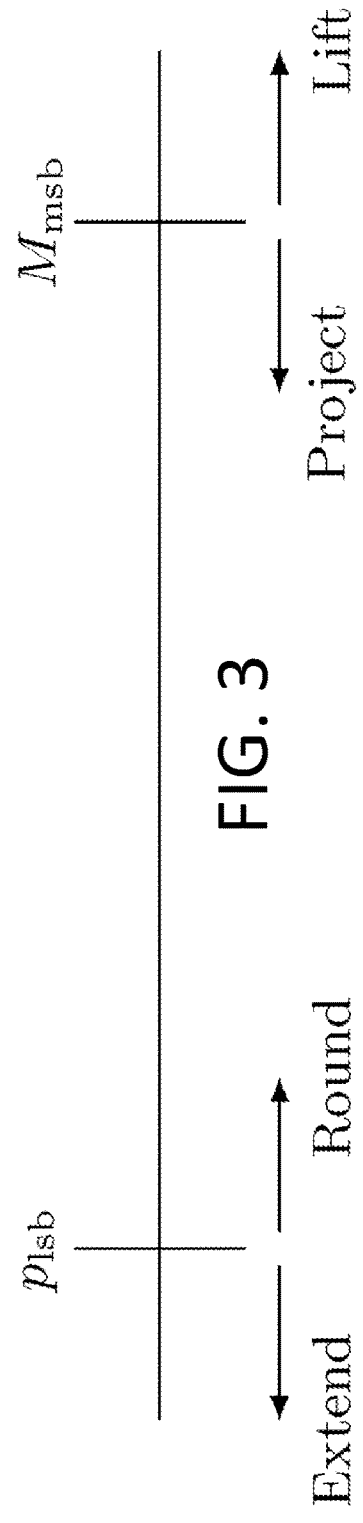
FIG. 3 illustrates four casting operations for casting representations between classes.

FIG. 3 illustrates four casting operations for casting representations between classes depending on whether we increase or decrease either of the parameters $p_{lsb}$ and $M_{msb}$. These four casting operations include Extend, Round, Project and Lift (with Lift being distinct from the four natural lifts referenced above).

FIG. 4 illustrates an example application of each of the four casting operations on an example input value. In the illustrated example, modular shares for the plaintext value $x = 1011.1_{(2)}$ are secret shared among two parties with modular shares $x_1 = 001000.10$ and $x_2 = 000011.00$ in $\mathcal{M}_{6,-2}$. The example shows how the share $x_1$ is cast to another modular number with a different parameter $p_{lsb}$ or $M_{msb}$. For simplicity, the operations are presented on scalars, but more generally, all these operations are to be performed independently on each coefficient of any vector/matrix/tensor.

Extend ($p'_{lsb} < p_{lsb}$): The Extend casting operation adds additional least significant bits to each input share and sets the new least significant bits to 0 in the new representation to fill in the new bits in the representation. The Extend operation does not require communication between the parties.

Round ($p'_{lsb} > p_{lsb}$): The Round casting operation deletes least significant bits from each input share. The Round casting operation can be implemented either with or without communication between the parties holding the shares. In the case that the Round casting operation is implemented without communication, each party rounds to remove the least significant bits locally from their share. This implementation does not guarantee that the $p'_{lsb}$ least significant bits of the plaintext are correct due to carry-related errors. The Round casting operation can, however, be implemented with communication between the parties to ensure that secret shares add up to a plaintext value whose $p'_{lsb}$ are correct. Such an implementation of the Round casting operation that preserves precision, called ShareRefresh, is presented below, but it is more expensive in terms of run-time, memory and communication.

Project ($M'_{msb} < M_{msb}$): The Project casting operation, which also does not require communication between the parties, transforms shares according to the following natural surjective homomorphism:

$$\mathbb{Z}/2^{M_{msb}-p_{lsb}}\mathbb{Z} \twoheadrightarrow \mathbb{Z}/2^{M'_{msb}-p_{lsb}}\mathbb{Z}$$

Lift ($M'_{msb} > M_{msb}$): The Lift casting operation requires communication between the parties as well as offline and online phases. An implementation of the Lift casting operation that computes the results correctly 100% of the time is presented below. This implementation improves on the prior work where the operations are probabilistic and have a non-zero probability of failure.

Below, we explain an implementation of the Lift casting operation with its online and offline phases in accordance with one embodiment. We do this in a slightly more general way by not necessarily assuming that $p'_{lsb} = p_{lsb}$. This has the practical advantage that one can often merge the cast operations Lift and ShareRefresh into a single operation that requires communication instead of two separate ones.

3.1 Implementation of the Lift Casting Operation on Secret Shares in Integer Modular Representation In this section we explain how to transform or cast a set of shares from a first modular class $\mathcal{M}_{M_{msb},p_{lsb}}$ into another set of shares of a second modular class $\mathcal{M}_{M'_{msb},p'_{lsb}}$, where the $M'_{msb}$ of the second class is greater than the $M_{msb}$ of the first class, and where the $p'_{lsb}$ of the second class can be less than, equal to or greater than the $p_{lsb}$ of the first class. We will refer to this particular cast operation on secret shares in integer modular representation as Lift (capitalized to distinguish from more general natural lifts described above). In one embodiment, the Lift operation is executed in part offline (without communication between the parties) and in part online (with communication between the parties) in a system for multi-party computation including a trusted dealer.

In accordance with one embodiment, the Lift operation operates on a secret shared MPC container (recall, as introduced in the Background section above), which is masked-and-revealed as follows:

secret shares $[\![x]\!]_{M_{msb},P_{lsb}}$ of a plaintext $x \in \mathcal{P}_{p_{msb},p_{lsb}}$ with $p_{msb} \le M_{msb} - 2$ mask shares $[\![\lambda]\!]_{M_{msb},P_{lsb}}$ whose sum $\lambda$ is uniformly random in $\mathcal{M}_{M_{msb},P_{lsb}}$ and unknown by the parties.

the masked value $a = x + \lambda \in \mathcal{M}_{M_{msb},P_{lsb}}$, revealed and known by all parties.

The goal of the Lift operation is to compute secret shares $[\![z]\!]_{M'_{msb},P'_{lsb}}$ of the same plaintext $x$, where $M'_{msb}$ is larger than $M_{msb}$.

Definition 4.

Let $\lambda \in \mathcal{M}_{M_{msb},P_{lsb}}$ and $N := 2^{M_{msb}}$.

We partition the range $$I = \left[-\frac{N}{4}, \frac{3N}{4}\right)$$

$\subset \mathbb{R}$ as the disjoint union $I_0 \sqcup I_1$ where $$I_0 := \left[-\frac{N}{4}, \frac{N}{4}\right) \text{ and } I_1 := \left[\frac{N}{4}, \frac{3N}{4}\right).$$

We define a selection variable or bit as follows $$b_\lambda = \begin{cases} 0 & \text{if } \text{quartermod}_N(\lambda) \in I_0 \Leftrightarrow \text{quartermod}_N(\lambda) < \frac{N}{4} \\ 1 & \text{if } \text{quartermod}_N(\lambda) \in I_1 \Leftrightarrow \text{quartermod}_N(\lambda) \ge \frac{N}{4} \end{cases}$$

In particular, $b_\lambda = 0$ is equivalent to $\lambda \in I_0 + 2^{M_{msb}}\mathbb{Z}$, which can be rewritten as $\lambda \in [-2^{M_{msb}-2}, 2^{M_{msb}-2})$. Similarly $b_\lambda = 1$ is equivalent to $\lambda \in I_1 + 2^{M_{msb}}\mathbb{Z}$, which can be rewritten as $\lambda \in [2^{M_{msb}-2}, 3 \times 2^{M_{msb}-2})$.

The cast operation leverages these two possibilities, which can be encoded into the bit $b_\lambda$, for $\text{quartermod}_N(\lambda)$: $\lambda \in I_0$ or $\lambda \in I_1$. Letting $a = x + \lambda \in 2^{P_{lsb}}\mathbb{Z}/2^{M_{msb}}\mathbb{Z}$, one can consider the two mathematical lifts (both in $\mathbb{R}$)

$$\tilde{a}_0 = \text{centermod}_N(a) \text{ and } \tilde{a}_1 = \text{pos mod}_N(a).$$

We can require that the secret shared value $x$ be within the range $x \in [-N/4, N/4)$, and with this condition being met, we observe the following equality:

$$\text{centermod}_N(x) + \text{quartermod}_N(\lambda) = \begin{cases} \tilde{a}_0 = \text{centermod}_N(a) & \text{if } b_\lambda = 0 \\ \tilde{a}_1 = \text{posmod}_N(a) & \text{if } b_\lambda = 1 \end{cases}$$

or more concisely $$\text{centermod}_N(x) + \text{quartermod}_N(\lambda) = \begin{cases} \tilde{a}_0 & \text{if } b_\lambda = 0 \\ \tilde{a}_1 & \text{if } b_\lambda = 1 \end{cases}.$$

One can logically rewrite this equation as $$\text{centermod}_N(x) + \text{quartermod}_N(\lambda) = \tilde{a}_0 + b_\lambda(\tilde{a}_1 - \tilde{a}_0) \in \mathbb{R} \quad (1)$$

in order to effectively select between the values $\tilde{a}_0$ and $\tilde{a}_1$ depending on the value of $b_\lambda$.

To obtain shares modulo $2^{M'_{msb}}$ for $x$ (the unmasking of $x$ into the second class), one can project the above equality to the torus $\mathbb{R}/2^{M'_{msb}}\mathbb{Z}$ the via the natural surjection $\mathbb{R} \twoheadrightarrow$ $\mathbb{R}/2^{M'_{msb}}\mathbb{Z}$. Since the trusted dealer can precompute and secret share the image $v$ of $\text{quartermod}_N(\lambda)$ (in $\mathcal{M}_{M'_{msb},P'_{lsb}} = 2^{P'_{lsb}}\mathbb{Z}/2^{M'_{msb}}\mathbb{Z}$), the parties can recover $[\![x]\!]_{M'_{msb},P'_{lsb}}$ out of knowledge of $$\tilde{a}_0 + b_\lambda(\tilde{a}_1 - \tilde{a}_0) \mod 2^{M'_{msb}}$$

in the online phase in conjunction with $v$ based on the above equation (1).

This can be done more particularly as follows. Let $a_j = \tilde{a}_j \mod 2^{M'_{msb}}$ for $j \in \{0, 1\}$. The parties can determine $(a_1 - a_0)$ based on the revealed masked value $a$. The trusted dealer precomputes $b_\lambda$ and secret shares it as $[\![b_\lambda]\!]$ amongst the parties. Although the secret sharing of $b_\lambda$ can be done in $\mathcal{M}_{M'_{msb},P'_{lsb}}$, we note that all but the top $M'_{msb} - M_{msb}$ bits of the binary representation of $(a_1 - a_0)$ will always be zero. It thus suffices for the trusted dealer to secret share the bit $b_\lambda$ using the smaller modular class $\mathcal{M}_{M'_{msb}-M_{msb},0}$ in order for the parties to perform multiplications on the shares of $[\![b_\lambda]\!]$ and $(a_1 - a_0)$.

To summarize, the trusted dealer needs to:

1. Generate a random mask $\lambda \in 2^{P_{lsb}}\mathbb{Z}/2^{M_{msb}}\mathbb{Z}$
2. Compute the selection bit $b_\lambda$ and secret share it in $\mathcal{M}_{M'_{msb}-M_{msb},0}$
3. Compute a particular lift $v$ of that $\lambda$ to $2^{P'_{lsb}}\mathbb{Z}/2^{M'_{msb}}\mathbb{Z}$ and secret share it in $\mathcal{M}_{M'_{msb},P'_{lsb}}$. More precisely, $$v := \text{roundTo}(\text{quartermod}_{2^{M_{msb}}}(\lambda), 2^{P'_{lsb}}) \mod 2^{M'_{msb}}$$

where the function $\text{roundTo}(z, 2^\ell)$ takes a real number $z$ and an integer $\ell$ and rounds $z$ to the nearest integer multiple of $2^\ell$. $v$ can then be secret shared as $[\![v]\!]$ in $\mathcal{M}_{M'_{msb},P'_{lsb}}$.

In the online phase of the computation, the parties use the lifts $a_0$ and $a_1$ to $2^{P'_{lsb}}/2^{M'_{msb}}\mathbb{Z}$ and only extract the top $M'_{msb} - M_{msb}$ bits for the oblivious selection in the computation of the above $\text{centermod}_N(x) + \text{quartermod}_N(\lambda)$.

3.1.1 Pseudocode Implementation of the Lift Operation

FIG. 5 illustrates a pseudocode implementation of an offline phase of the Lift operation in accordance with one embodiment. FIG. 6 illustrates a pseudocode implementation of an online phase of the Lift operation in accordance with this embodiment.

In addition to the roundTo function described above, the Lift operation as illustrated in FIGS. 5 and 6 leverages the secretShares function, which takes as inputs a value and a specification of a class, and outputs a plurality of secrets shares summing to the input value in the representation of the supplied specification of the class.

With respect to the online phase of the operation illustrated in FIG. 6, we define the operation ⊠ (for $x \in 2^{P'_{lsb}}\mathbb{Z}/2^{M'_{msb}}\mathbb{Z}$ and $y \in \mathbb{Z}/2^{M'_{msb}-M_{msb}}\mathbb{Z}$) as $x \boxtimes y := \text{msb}_{M_{msb}-M_{msb}}(x) \cdot y$ extended with $M_{msb} - p'_{lst}$ zeroes at the end. In this definition, the function $\text{msb}_N(x)$ outputs the N most significant bits of $x$.

3.2 the ShareRefresh Operation

Definition 5. Let $(M_{msb}, p_{lsb})$ and $(M'_{msb}, p'_{lsb})$ be two pairs of parameters such that $M'_{msb} \le M_{msb}$. The map $$\text{projectAndRound}: \mathcal{M}_{M_{msb},P_{lsb}} \to \mathcal{M}_{M'_{msb},P'_{lsb}}$$

is defined as follows: for $z \in \mathcal{M}_{params}$, let $z_0$ be any of its representatives in $\mathbb{R}$ and set $$\text{projectAndRound}_{M'_{msb},P'_{lsb}}(z) := \underset{q \in 2^{p'_{lsb}}\mathbb{Z}}{\text{argmin}} |z_0 - q| (\text{mod } 2^{M'_{msb}})$$

One can observe that this can be rewritten as:

$$\text{projectAndRound}_{M'_{msb},p'_{lsb}}(z) := 2^{p'_{lsb}} \lfloor z_0 2^{-p'_{lsb}} \rfloor \pmod{2^{M'_{msb}}}$$

Notation note: the notation $\lfloor x \rceil$ is used herein to denote rounding of the number x to the nearest integer.

Proposition 1. The Definition 5 is well-defined, i.e. it does not depend on the choice of the representative $z_0$.

Proof. Let $z \in M_{params}$ and let $z_1, z_2$ be two representatives of z in $\mathbb{R}$. By definition, there exists $\omega \in \mathbb{Z}$ such that $z_1 - z_2 = 2^{M_{msb}} \omega$. Since $p'_{lsb} \leq M'_{msb} \leq M_{msb}$, we have $2^{M_{lsb} - p'_{lsb}} \omega \in \mathbb{Z}$. In particular, $\lfloor z_1 2^{-p'_{lsb}} \rceil = \lfloor z_2 2^{-p'_{lsb}} \rceil + 2^{M_{msb} - p'_{lsb}} \omega$. Since $M'_{msb} \leq M_{msb}$, we get $2^{p'_{lsb}} \lfloor z_1 2^{-p'_{lsb}} \rceil \equiv 2^{p'_{lsb}} \lfloor z_2 2^{-p'_{lsb}} \rceil \pmod{2^{M'_{msb}}}$.

From this point on, we assume that params and params' satisfy the assumptions of Proposition 1.

In one embodiment, a Share Refresh operation is executed in part offline (without communication between the parties) and in part online (with communication between the parties). FIG. 7 illustrates a pseudocode implementation of an offline phase of the Share Refresh operation in accordance with one embodiment. FIG. 8 illustrates a pseudocode implementation of an online phase of the Share Refresh operation in accordance with this embodiment.

4 Beaver Multiplication 4.1 Multiplication on ModReal Backend

The multiplication between two secret shares $[\![x]\!]_{M^x_{msb},p^x_{lsb}}$ and $[\![y]\!]_{M^y_{msb},p^y_{lsb}}$ is defined in:

$$\mathcal{M}_{M^x_{msb},p^x_{lsb}} \times \mathcal{M}_{M^y_{msb},p^y_{lsb}} \to \mathcal{M}_{M^z_{msb},p^z_{lsb}}$$

where $M^z_{msb}$ and $P^z_{lsb}$ are referred to as the output parameters. These parameters are typically determined by the compiler during a static analysis.

4.2 Parameter Computation Expressions

The following expressions show the computation of various parameters that are used in conjunction with the figures and descriptions of the beaver multiplication operations that follow:

$$p_{lsb}^{Aw} = \max(p_{lsb}^A, p_{lsb}^z - p_{msb}^B)$$

$$p_{lsb}^{Bw} = \max(p_{lsb}^B, p_{lsb}^z - p_{msb}^A)$$

$$p_{lsb}^W = p_{lsb}^{Aw} + p_{lsb}^{Bw}$$

$$p_{lsb}^W = \min(p_{msb}^A + p_{msb}^B, p_{msb}^z)$$

$$M_{msb}^W = p_{msb}^W + 2$$

$$\eta = M_{msb}^W - p_{lsb}^W$$

$$M_{msb}^{Aw} = p_{lsb}^{Aw} + \eta$$

$$M_{msb}^{Bw} = p_{lsb}^{Bw} + \eta$$

4.3 Beaver Multiplication on Modular Backend (Secret-Secret)

Figure 10:
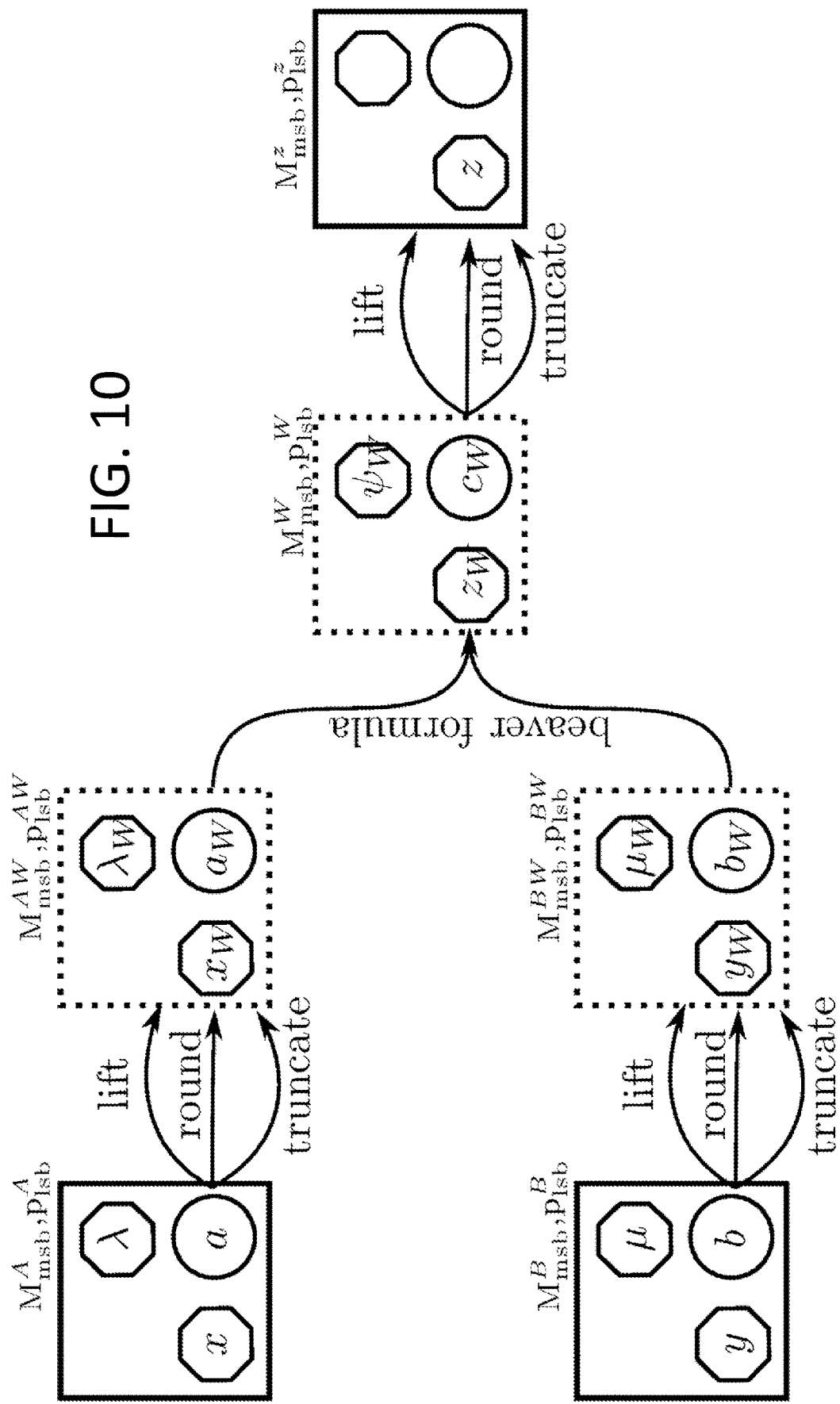
FIG. 10 illustrates a schematic of the Beaver multiplication operation.

FIG. 9 illustrates a pseudocode implementation of a Beaver multiplication operation on two secret shared values in modular representation in accordance with one embodiment. FIG. 10 illustrates a schematic of the Beaver multiplication operation.

4.4 Beaver Multiplication on Modular Backend (Secret-Public)

FIG. 11 illustrates a pseudocode implementation of a Beaver multiplication operation on one secret shared value in modular representation and one public value in accordance with one embodiment. FIG. 12 illustrates a schematic of the Beaver multiplication operation.

5 Linear Combination

Let $c^{(1)}, \ldots, c^{(n)}$ be public real numbers given as double-precision floating point numbers, and let $[\![x^{(1)}]\!], \ldots, [\![x^{(n)}]\!]_*$ be secret shares with corresponding parameters $M_{msb}^{(i)}, p_{msb}^{(i)}, p_{lsb}^{(i)}$. Let $\beta^{(i)} := \lfloor 2^{24} \cdot c^{(i)} \rceil$, $\alpha^{(i)} := 2^{-v_2(\beta^{(i)})} \beta^{(i)}$, and $k^{(i)} := 24 - v_2(\beta^{(i)})$, where for a prime p, $v_p(m)$ denotes p-adic valuation of an integer $m \in \mathbb{Z}$. In practice, these integers can be represented as 64-bit signed integers. The public vector $$\left( \frac{\alpha^{(1)}}{2^{k^{(1)}}}, \ldots, \frac{\alpha^{(n)}}{2^{k^{(n)}}} \right) \neq 0$$

will be our approximation of the coefficients. The choice of 24 above is in order to resemble the plaintext of type float32, whereby the mantissa is 24 bits.

The goal is then to compute a secret share of $$z = \sum_{i=1}^{n} \frac{\alpha^{(i)}}{2^{k^{(i)}}} \cdot x^{(i)}$$

with corresponding parameters $M_{msb}^z$ and $p_{lsb}^z$. We assume that the input shares are either simultaneously in floating point representation or in modular representation. In one embodiment, mixed inputs are not supported and require an explicit cast. The output backend, however, can be different from the input backend (e.g., having inputs in floating point representations and output in modular representation is fine).

5.1 Default Output Parameters

When no plaintext parameters are available for the output, the statistical analyzer of the compiler may use the following propagation formula to estimate the stats of the result: if all plaintexts are independent variables of mean and variance $\mathbb{E}(x^{(i)})$, $\text{Var}(x^{(i)})$, then the mean and variance of the output $$z = \sum_{i=1}^{n} c^{(i)} x^{(i)} \text{ are:}$$

$$\mathbb{E}(z) = \sum_{i=1}^{n} c^{(i)} \mathbb{E}(x^{(i)})$$

$$\text{Var}(z) = \sum_{i=1}^{n} (c^{(i)})^2 \text{Var}(x^{(i)})$$

Note that the last formula is only true for independent variables. In one embodiment, we use the following estimate for the variance of a sum:

$$\text{Var}(X+Y) = \text{Var}(X) + \text{Var}(Y) + 2 \text{ Cov}(X,Y) \leq \text{Var}(X) + \text{Var}(Y) + 2\sqrt{\text{Var}(X) \cdot \text{Var}(Y)} = (\sigma_X + \sigma_Y)^2.$$

Based on this propagation formula, the compiler can already infer a reasonable $p_{msb}, p_{lsb}$ for the output container, and then assign a $M_{msb} > p_{msb}$ to ensure the correctness and security of the computation. If the compiler cannot make the independence assumption, other techniques should be used to estimate the stats of the result, like simulation on fake values for instance.

5.2 Cleaning Step

In one embodiment, before running a linear combination, the compiler preprocesses the linear combination input as follows: for all $1 \leq i \leq n$, Remove all indices i for which $\alpha^{(i)} = 0$.

Remove all indices i for which:

$$\log_2|\alpha^{(i)}| - k^{(i)} + p_{msb}^{(i)} \leq \max_j(\log_2|\alpha^{(j)}| - k^{(j)} + p_{lsb}^{(j)}).$$

This means that the term is negligible and can be discarded. Note that if we are dynamically removing terms one-by-one, the right-hand side of the above inequality will not change (a term that is removed cannot have a $p_{lsb}$ that equals the maximum).

FIG. 13 illustrates an example input upon which the cleaning step can be performed. In the example, the interval with label 1 should be discarded as negligible since the $p_{msb}$ position is left of the maximal $p_{lsb}$ position of the remaining intervals.

Furthermore, letting $\mathcal{J}$ be the remaining index set, we can test according to the following criteria (the output parameters should intersect the input parameters windows):

Ensure the inequality $$p_{lsb}^{(z)} \leq \max_{i \in \mathcal{J}}(\log_2|\alpha^{(i)}| - k^{(i)} + p_{msb}^{(i)})$$

Otherwise, declare the result negligible or zero.
Ensure the following inequality $$p_{msb}^{(z)} \geq \max_{i \in \mathcal{J}}(\log_2|\alpha^{(i)}| - k^{(i)} + p_{lsb}^{(i)})$$

Otherwise, one gets undefined behavior.

5.3 Linear Combination Builtin: ModReal Case

In one embodiment, the compiler provides two working parameters for the linear combination: $M_{msb}^w$ and $p_{lsb}^w$. These are selected in such a way that they satisfy the following properties:

The lift to the ModReal shares class $\mathcal{M}_{M_{msb}^w, p_{lsb}^w}$ of the inputs ensures that the individual scalar products $$\frac{\alpha^{(i)}}{2^{k^{(i)}}} \cdot x^i$$

can be computed without overflow and keeping sufficient precision (the latter to be defined precisely).

The sum of ALL secret shares (there are k of them) of ALL individual terms (scalar products; there are n of them) can be computed in this class without an overflow (the latter to be defined precisely).

This makes the following default choice of parameters reasonable:

$$p_{lsb}^w(1) = p_{lsb}^z - \log_2(nk)/2,$$

$$p_{lsb}^w(2) = \min_{1 \leq i \leq k}(p_{lsb}^{(i)} - k^{(i)}),$$

$$M_{msb}^w = M_{msb}^z,$$

$$p_{lsb}^w = \max(p_{lsb}^w(1), p_{lsb}^w) \tag{2}$$

For each $1 \leq i \leq n$, the ith input container is first casted to a ModReal number with parameters $M_{msb}^w + k^{(i)}$ and $Mp_{lsb}^w + k^{(i)}$. When $M_{msb}^w + k^{(i)} > M_{msb}^{(i)}$, this requires a lift triplet (involving the container's mask X, and two ephemeral precomputed data b, v. Then, the multiplication by $\alpha^{(i)}/2^{k^{(i)}}$ yields a serializable value of parameters $M_{msb}^w$ and $p_{lsb}^w$, which gets accumulated with the other values. Finally, the sum is cast to the output parameters.

Figure 15:
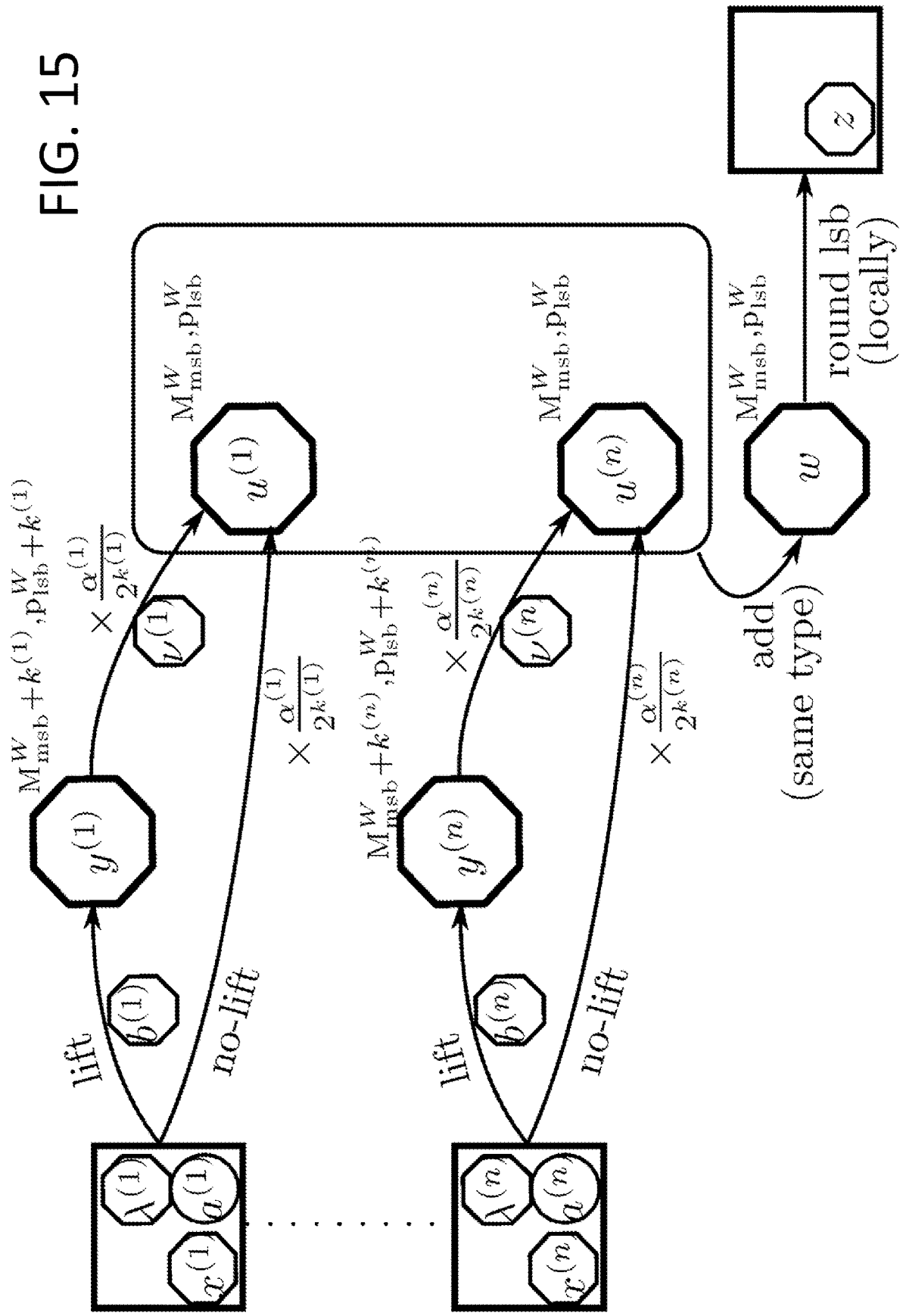
FIG. 15 illustrates a schematic of the Linear combination operation.

FIG. 14 illustrates a pseudocode implementation of a Linear combination operation with ModReal representation in accordance with one embodiment. FIG. 15 illustrates a schematic of the Linear combination operation.

6 Fourier Approximation of Real-Valued Functions

Normally, a Fourier approximation of a complex-valued function $f(x)$ will be given in the form $$f(x) \sim \sum_{n=-N}^{N} a_n e^{2\pi i n x/T}$$

where T is the period and $a_n \in \mathbb{C}$. The coefficients $a_n$ are in general complex numbers, but if $f(x)$ is a real-valued function then $a_{-n} = \overline{a_n}$, for $n > 0$ and $a_0 \in \mathbb{R}$. We then have $$f(x) \sim Re\left(\sum_{n=0}^{N} c_n e^{2\pi i n x/T - i\varphi_n}\right).$$

This yields the transform $$f(x) \sim \sum_{n=0}^{N} c_n \cos\left(\frac{2\pi n x}{T} - \varphi_n\right) \tag{2}$$

A Fourier term will be a triple $(c_n, n, \varphi_n)$ for $n=0, 1, \ldots, N$ where $c_n \in \mathbb{R}$ is the real coefficient and $\varphi_n$ is the phase.

As an example, consider the sigmoid function $$\sigma(x) = \frac{1}{1 + e^{-x}}.$$

The real-valued function $f(x) = \sigma(x) - \frac{1}{2}$ is then odd, which implies that the phases $\varphi_n$ are all equal to $\pi/2$.

6.1 Fourier Series Evaluation: ModReal Case

We now explain how to evaluate the expression (2) for $x \in \mathcal{P}_{p_{msb}, p_{lsb}}$ and secret shares $[\![x]\!] \in \mathcal{M}_{M_{msb}, p_{lsb}}$.

Recall that the mask $\lambda \in [-\frac{1}{4} \cdot 2^{M_{msb}}, \frac{3}{4} \cdot 2^{M_{msb}})$.

The trusted dealer first computes the mask $\lambda$, the corresponding bit $b_\lambda$ and then computes and secret shares (in the offline phase) the vector $C_n e^{-2\pi i n \lambda/T - i\varphi_n}$ for $n=0, 1, \ldots, N$ The online computation is then performed as follows:

1. Compute $\overline{a} = x + \lambda$ as an element of $\mathbb{Z}/2^{M_{msb}}\mathbb{Z}$.
2. Compute the correct lift $a = x + \lambda \in \mathbb{R}$ by using the secret shares of $\overline{a}$ and of $b_\lambda$. This is possible since $a = \text{centermod}(\overline{a}) + 2^{M_{msb}} \cdot b_\lambda \cdot \text{msb}(\overline{a})$.
3. Compute $e^{2\pi i n a/T}$ for $n=0, 1, \ldots, N$ (this requires the lift a and not just the original $\overline{a}$).
4. Compute secret shares of $c_n e^{2\pi i n x/T} = e^{2\pi i n a/T} \cdot (c_n e^{-2\pi i n \lambda/T - i\varphi_n})$. This requires local multiplications in a certain plaintext class to be determined.

To determine the plaintext parameters of the result, we impose the constraint that the entire computation occurs within a maximal numerical window of $\eta$ bits (e.g., $\eta=64$ if we would like to use only 64-bit integers on the backend).

First, $p_{msb}^z$ can be estimated using the trivial bound, namely $$p_{msb}^z = \log_2\left(\sum_{n=0}^{N}|c_n|\right).$$

To get the optimal $p_{lsb}^z$ let p be the numerical window, that is $p=p_{msb}^z-p_{lsb}^z$. Letting $\varepsilon=\lceil\log_2 N\rceil$, our constraint is given by the inequality $$2p+\varepsilon+2 \leq \eta,$$

i.e., $$p \leq \frac{\eta-\varepsilon-2}{2}$$

That means that we need to determine the maximal numerical window for the output of the computation. To see why this inequality should hold, note that if one requires p bits of precision for each of the multipliers in the products $$c_n e^{2\pi i n x/T} = e^{2\pi i n a/T}\cdot\left(c_n e^{-\frac{2\pi i n \lambda}{T}-\varphi_n}\right),$$

hence, the 2p. We then have to take the sum of $\varepsilon$ of these terms and add the two additional bits for the modular shares class. Hence, we can set $$p_{lsb}^z = p_{msb}^z - \left\lfloor\frac{\eta-\varepsilon-2}{2}\right\rfloor$$

In addition, the compiler needs to provide working parameters for the Fourier series builtin:

$(M_{msb}^{aw}, p_{lsb}^{aw})$—lifting parameters for the masked value $a=x+\lambda$, $(M_{msb}^{lw}, p_{lsb}^{lw})$—lifting parameters for the mask $\lambda$.

To determine the working parameters, we start by determining the least significant bit positions (we do this in order to guarantee sufficient precision). The following formulas are reasonable:

$p_{lsb}^{aw}=-p$ and $M_{msb}^{aw}=p_{lsb}^{aw}+\eta$, $p_{lsb}^{lw}=-p_{lsb}^z-\varepsilon$ and $M_{msb}^{lw}=p_{lsb}^{lw}+\eta$.

This choice requires some justification: the parameter $p_{lsb}^{aw}=-p$ ensures that we have a numerical window of size p in the computation of $e^{2\pi i n a/T}$. Indeed, the most significant bit position for that quantity is 0, so we need at least p binary digits in the fractional part. Yet, the computation assumes that both inputs to Beaver require the same numerical window, that is, we have a multiplication that can be viewed as a map $$\mathcal{M}_{M_{msb}^{aw},p_{lsb}^{aw}} \times \mathcal{M}_{M_{msb}^{lw},p_{lsb}^{lw}} \to$$
$$\mathcal{M}_{p_{lsb}^{lw}+p_{lsb}^{aw}+\eta,p_{lsb}^{lw}+p_{lsb}^{aw}}.$$

7 Communication Model

FIGS. 16A and 16B illustrate schematics of communication channels between computing systems during an offline phase of a multi-party computation (MPC). FIG. 16A shows the communication channels for a trusted dealer model while FIG. 16B shows the channels for the honest but curious model. In the trusted dealer model, the dealer sends numerical masking data (also referred to as triplets) to each party via a private channel. In the honest but curious model, the parties have access to a private broadcast channel shared between all of them, and each party shares an additional private channel with the dealer. The private channels are denoted with dashed lines. In the trusted dealer model, the dealer generates the masking data and uses private channels to send to each party a respective share of the data (one-way arrows). In the honest but curious model, the parties collaborate for the generation of the numerical masking data, and to do this, they need an additional private broadcast channel between them that is not accessible to the dealer. Although only three parties are shown, the model can be extended to an arbitrary number of parties.

FIG. 17 illustrates a schematic of communication channels between parties during an online phase in accordance with one embodiment. The parties send and receive masked values via a public broadcast channel denoted with solid lines. The online phase is the same in both the trusted dealer and honest but curious models and the dealer is not present.

Although the methods disclosed herein are in some cases described with respect to the trusted dealer model, these methods can also be used with the honest but curious model.

8 Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 18:
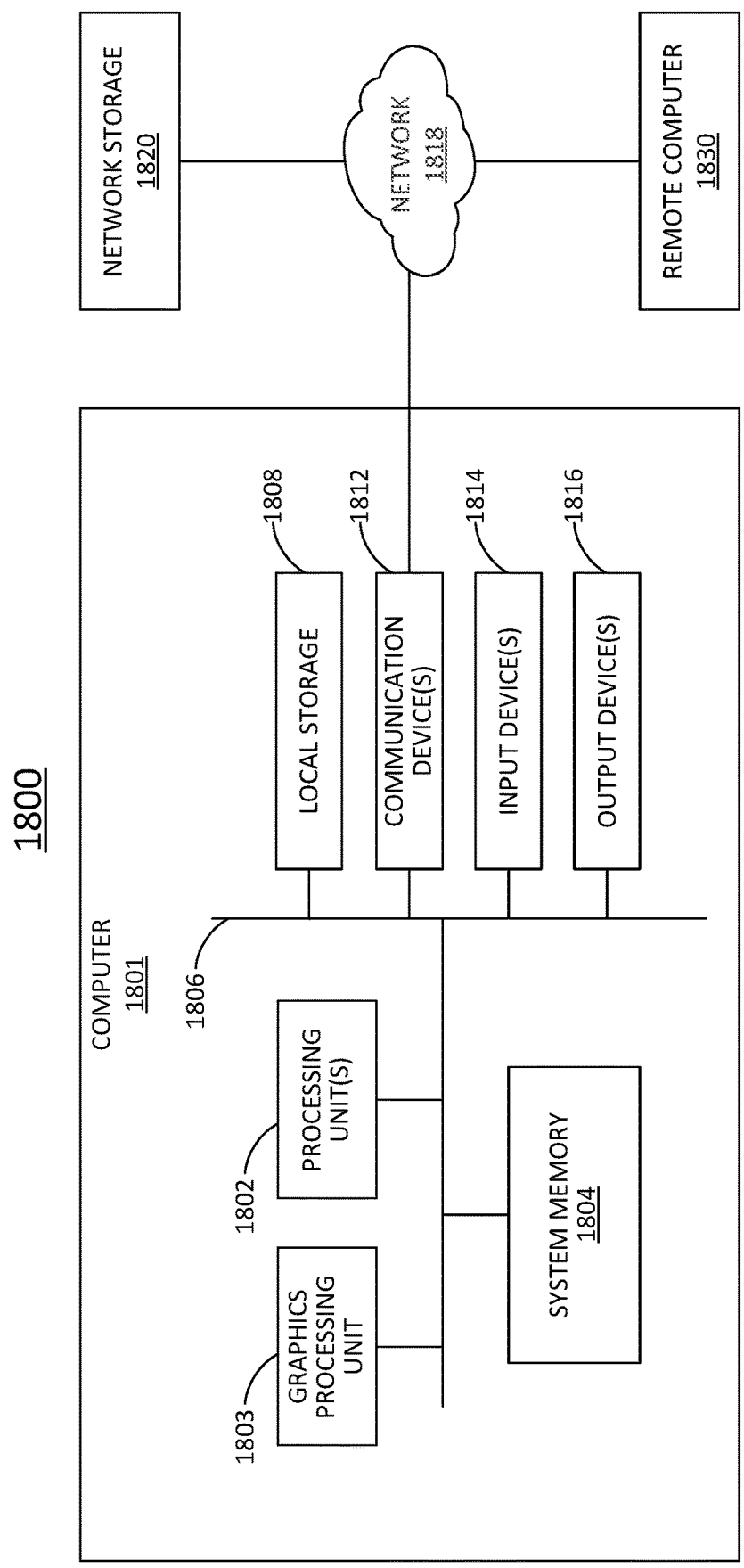
FIG. 18 illustrates a general computer architecture that can be appropriately configured to implement components disclosed herein.

FIG. 18 illustrates a general computer architecture 1800 that can be appropriately configured to implement components disclosed in accordance with various embodiments.

The computing architecture 1800 can include various common computing elements, such as a computer 1801, a network 1818, and one or more remote computers 1830. The embodiments disclosed herein, however, are not limited to implementation by the general computing architecture 1800.

Referring to FIG. 18, the computer 1801 can be any of a variety of general purpose computers such as, for example, a server, a desktop computer, a laptop computer, a tablet computer or a mobile computing device. The computer 1801 can include a processing unit 1802, a system memory 1804 and a system bus 1806.

The processing unit 1802 can be or include one or more of any of various commercially available computer processors, which can each include one or more processing cores that can operate independently of each other. Additional co-processing units, such as a graphics processing unit 1803, also can be present in the computer.

The system memory 1804 can include volatile devices, such as dynamic random access memory (DRAM) or other random access memory devices. The system memory 1804 can also or alternatively include non-volatile devices, such as a read-only memory or flash memory.

The computer 1801 can include local non-volatile secondary storage 1808 such as a disk drive, solid state disk, or removable memory card. The local storage 1808 can include one or more removable and/or non-removable storage units. The local storage 1808 can be used to store an operating system that initiates and manages various applications that execute on the computer. The local storage 1808 can also be used to store special purpose software configured to implement the components of the embodiments disclosed herein and that can be executed as one or more applications under the operating system.

The computer 1801 can also include communication device(s) 1812 through which the computer communicates with other devices, such as one or more remote computers 1830, over wired and/or wireless computer networks 1818. Communications device(s) 1812 can include, for example, a network interface for communicating data over a wired computer network. The communication device(s) 1812 can include, for example, one or more radio transmitters for communications over Wi-Fi, Bluetooth, and/or mobile telephone networks.

The computer 1801 can also access network storage 1820 through the computer network 1818. The network storage can include, for example, a network attached storage device located on a local network, or cloud-based storage hosted at one or more remote data centers. The operating system and/or special purpose software can alternatively be stored in the network storage 1820.

The computer 1801 can have various input device(s) 1814 such as a keyboard, mouse, touchscreen, camera, microphone, accelerometer, thermometer, magnetometer, or any other sensor. Output device(s) 1816 such as a display, speakers, printer, or eccentric rotating mass vibration motor can also be included.

The various storage 1808, communication device(s) 1812, output devices 1816 and input devices 1814 can be integrated within a housing of the computer, or can be connected through various input/output interface devices on the computer, in which case the reference numbers 1808, 1812, 1814 and 1816 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

9 Concluding Comments

Although the subject matter has been described in terms of certain embodiments, other embodiments that may or may not provide various features and aspects set forth herein shall be understood to be contemplated by this disclosure. The specific embodiments described above are disclosed as examples only, and the scope of the patented subject matter is defined by the claims that follow. In the claims, the term "based upon" shall include situations in which a factor is taken into account directly and/or indirectly, and possibly in conjunction with other factors, in producing a result or effect. In the claims, a portion shall include greater than none and up to the whole of a thing; encryption of a thing shall include encryption of a portion of the thing. In method claims, any reference characters are used for convenience of description only, and do not indicate a particular order for performing a method.

The invention claimed is:

1. A method for casting a secret shared value from a first modular representation to a second modular representation, the method being performed by a secure multi-party computing system configured for performing multi-party computations on secret shared values, the secure multi-party computing system comprising a trusted dealer computing system and a plurality of party computing systems in secure networked communication, the method comprising:

each of the party computing systems storing a respective secret share of the secret shared value in the first modular representation,
wherein the first modular representation has a range defined by a most significant bit position and a least significant bit position of the first modular representation;
the trusted dealer computing system storing a masking value and communicating to each of the party computing systems a respective secret share of the masking value in the first modular representation, wherein the masking value is secret shared between the party computing systems in the first modular representation;
the trusted dealer computing system:
determining a subrange in which the masking value resides, wherein the subrange is selected from a plurality of predetermined non-overlapping subranges representing the range of the first modular representation,
encoding the determined subrange into a numerical subrange identifier, and
communicating to each of the party computing systems a respective secret share of the numerical subrange identifier, wherein the numerical subrange identifier is secret shared between the party computing systems;
the trusted dealer computing system transforming the masking value, in a first transformation, into a transformed masking value by at least performing a first mathematical lift on the masking value;
the trusted dealer computing system communicating to each of the party computing systems a respective secret share of the transformed masking value in the second modular representation, wherein the transformed masking value is secret shared between the party computing systems in the second modular representation, wherein the second modular representation has a range defined by a most significant bit position and a least significant bit position of the second modular representation, and wherein the most significant bit position of the second modular representation is greater than the most significant bit position of the first modular representation;
the party computing systems masking and revealing the secret shared value as a masked value representing a sum of the secret shared value and the masking value without revealing the secret shares of the secret shared value or the secret shares of the masking value;
transforming the masked value, in a second transformation, into a first transformed masked value by at least performing a second mathematical lift on the masked value;
transforming the masked value, in a third transformation, into a second transformed masked value by at least performing a third mathematical lift on the masked value,
wherein the first mathematical lift, the second mathematical lift and the third mathematical lift are each different from one another; and
the party computing systems collaboratively computing the secret shared value in the second modular representation, wherein each of the party computing systems computes a respective secret share of the secret shared value in the second modular representation based on:
the first transformed masked value,
the second transformed masked value,
for each party computing system, the respective secret share of the numerical subrange identifier, and
for each party computing system, the respective secret share of the transformed masking value.

2. The method of claim 1,
wherein the first mathematical lift and the second mathematical lift produce values relative to each other that are offset by one quarter of the range of the first modular representation, and
wherein the second mathematical lift and the third mathematical lift produce values relative to each other that are offset by one half of the range of the first modular representation.

3. The method of claim 1, wherein the first mathematical lift, the second mathematical lift, and the third mathematical lift are each selected from a group consisting of:
a quartermod lift parameterized by $2^{M_{msb}}$, where ($M_{msb}-1$) is the most significant bit position of the first modular representation,
a centermod lift parameterized by $2^{M_{msb}}$, and
a posmod lift parameterized by $2^{M_{msb}}$.

4. The method of claim 1,
wherein the first mathematical lift is a quartermod lift on the masking value parameterized by $2^{M_{msb}}$,
wherein the second mathematical lift is a centermod lift on the masked value parameterized by $2^{M_{msb}}$,
wherein the third mathematical lift is a posmod lift on the masked value parameterized by $2^{M_{msb}}$, and
where ($M_{msb}-1$) is the most significant bit position of the first modular representation.

5. The method of claim 4,
wherein a quartermod lift on x parameterized by $2^M$ is defined as a unique real $$\tilde{x} \in \left[-\frac{2^M}{4}, \frac{3 \cdot 2^M}{4}\right)$$

such that $\tilde{x}-x \in 2^M \mathbb{Z}$,
wherein a centermod lift on x parameterized by $2^M$ is defined as a unique real $$\tilde{x} \in \left[-\frac{2^M}{2}, \frac{2^M}{2}\right)$$

such that $\tilde{x}-x \in 2^M \mathbb{Z}$, and
wherein a posmod lift on x parameterized by $2^M$ is defined as a unique real $\tilde{x} \in 0, 2^M)$ such that $\tilde{x}-x \in 2^M \mathbb{Z}$.

6. The method of claim 5,
wherein the first transformation further comprises:
rounding a result of the first mathematical lift to a nearest multiple of $2^{p'_{lsb}}$ to produce a first rounding, where $p'_{lsb}$ is the least significant bit position of the second modular representation, and
taking a modulo $2^{M'_{msb}}$ of the first rounding, where ($M'_{msb}-1$) is the most significant bit position of the second modular representation;
wherein the second transformation further comprises:
rounding a result of the second mathematical lift to a nearest multiple of $2^{p'_{lsb}}$ to produce a second rounding, and
taking a modulo $2^{M'_{msb}}$ of the second rounding; and
wherein the third transformation further comprises:
rounding a result of the third mathematical lift to a nearest multiple of $2^{p'_{lsb}}$ to produce a third rounding, and
taking a modulo $2^{M'_{msb}}$ of the third rounding.

7. The method of claim 1, wherein the first transformation, the second transformation and the third transformation each comprises projecting a result of the first mathematical lift, the second mathematical lift, and the third mathematical lift, respectively, onto $\mathbb{R}/2^{M'_{msb}}\mathbb{Z}$, where ($M'_{msb}$−1) is the most significant bit position of the second modular representation.

8. The method of claim 1, wherein the plurality of predetermined non-overlapping subranges consists of two equally sized subranges, and wherein the numerical subrange identifier is selected from a group consisting of the numbers 0 and 1.

9. The method of claim 8, wherein the secret shared numerical subrange identifier is used by the party computing systems collaboratively to select between the first transformed masked value and the second transformed masked value for use in calculating the secret shared value in the second modular representation.

10. The method of claim 1, wherein the first modular representation and the second modular representation are fixed point integer representations of real numbers.

11. A system comprising a plurality of computer systems, wherein the plurality of computer systems perform the method of claim 1.

12. A non-transitory computer-readable medium encoded with computer code that is executed by a plurality of computer systems and causes the plurality of computer systems to perform the method of claim 1.

13. A method for casting a secret shared value from a first modular representation to a second modular representation, the method being performed by a secure multi-party computing system configured for performing multi-party computations on secret shared values, the secure multi-party computing system comprising a plurality of party computing systems in secure networked communication, the method comprising:

each of the party computing systems storing a respective secret share of the secret shared value in the first modular representation,
wherein the first modular representation has a range defined by a most significant bit position and a least significant bit position of the first modular representation;

communicating to each of the party computing systems a respective secret share of a masking value, wherein the masking value is secret shared between the party computing systems in the first modular representation;

communicating to each of the party computing systems a respective secret share of an indication of a subrange in which the masking value resides, wherein the subrange is selected from a plurality of predetermined non-overlapping subranges representing the range of the first modular representation, wherein the subrange indication is secret shared between the party computing systems;

transforming the masking value, in a first transformation, into a transformed masking value by at least performing a first mathematical lift on the masking value;

communicating to each of the party computing systems a respective secret share of the transformed masking value in the second modular representation, wherein the transformed masking value is secret shared between the party computing systems in the second modular representation, wherein the second modular representation has a range defined by a most significant bit position and a least significant bit position of the second modular representation, and wherein the most significant bit position of the second modular representation is greater than the most significant bit position of the first modular representation;

the party computing systems masking and revealing the secret shared value as a masked value representing a sum of the secret shared value and the masking value without revealing the secret shares of the secret shared value or the secret shares of the masking value;

transforming the masked value, in a second transformation, into a first transformed masked value by at least performing a second mathematical lift on the masked value;

transforming the masked value, in a third transformation, into a second transformed masked value by at least performing a third mathematical lift on the masked value,
wherein the first mathematical lift, the second mathematical lift and the third mathematical lift are each different from one another; and the party computing systems collaboratively computing the secret shared value in the second modular representation, wherein each of the party computing systems computes a respective secret share of the secret shared value in the second modular representation based on:
the first transformed masked value,
the second transformed masked value,
for each party computing system, the respective secret share of the subrange indication, and
for each party computing system, the respective secret share of the transformed masking value.

14. The method of claim 13, wherein the first transformation, the second transformation and the third transformation each comprises projecting a result of the associated mathematical lift onto $\mathbb{R}/2^{M'_{msb}}\mathcal{P}$, where ($M'_{msb}$−1) is the most significant bit position of the second modular representation.

15. The method of claim 13, wherein the "plurality of predetermined non-overlapping subranges" consists of two equally sized subranges, and wherein the numerical subrange identifier is selected from a group consisting of the numbers 0 and 1.

16. The method of claim 15, wherein the secret shared numerical subrange identifier is used by the party computing systems collaboratively to select between the first transformed masked value and the second transformed masked value for use in calculating the secret shared value in the second modular representation.

17. The method of claim 13, wherein the first modular representation and the second modular representation are fixed point integer representations of real numbers.

18. A method for performing a multiplication of a first secret shared value stored in a respective initial modular representation and a second secret shared value stored in a respective initial modular representation, the method comprising:

casting, in accordance with the method of claim 13, at least one of the first secret shared value and the second secret shared value into a common modular representation such that both the first secret shared value and the second secret shared value are stored in the common modular representation; and performing a beaver multiplication on the first secret shared value and the second secret shared value in the common modular representation.

19. A method for combining a plurality of secret shared values, each being stored in a respective initial modular representation, and a corresponding plurality of static coefficients, the method comprising:
- casting, in accordance with the method of claim 13, at least one of the plurality of secret shared values into a common modular representation such that all of the plurality of secret shared values are stored in the common modular representation; and
- performing a linear combination on the plurality of secret shared values stored in the common modular representation and the corresponding plurality of static coefficients.

20. A method for evaluating a continuous function on a secret shared value, the method comprising:
- selecting a Fourier series, based on the secret shared value, from a plurality of determined Fourier series, wherein each of the plurality of determined Fourier series is configured to approximate the continuous function on an associated subinterval of a domain of the continuous function;
- based on the selection, casting, in accordance with the method of claim 13, the secret shared value from the first modular representation to the second modular representation; and
- approximating a value of the continuous function on the secret shared value in the second modular representation using the selected Fourier series.

* * * * *

UNITED STATES PATENT AND TRADEMARK OFFICE
CERTIFICATE OF CORRECTION

| | |
|---|---|
| PATENT NO. | : 11,050,558 B2 |
| APPLICATION NO. | : 17/093008 |
| DATED | : June 29, 2021 |
| INVENTOR(S) | : Mariya Georgieva et al. |

It is certified that error appears in the above-identified patent and that said Letters Patent is hereby corrected as shown below:

In the Claims

In Column 28, Lines 40-41, in Claim 15, delete "numerical subrange identifier" and insert -- subrange indication --.

In Column 28, Line 44, in Claim 16, delete "numerical subrange identifier" and insert -- subrange indication --.

Signed and Sealed this
Ninth Day of January, 2024

Katherine Kelly Vidal
*Director of the United States Patent and Trademark Office*